(12) United States Patent
Zhou et al.

(10) Patent No.: US 12,711,699 B2
(45) Date of Patent: Aug. 18, 2026

(54) HIGH SPEED SINGLE-FRAME LABEL-FREE CELL TOMOGRAPHY

(71) Applicants: The Chinese University of Hong Kong, Hong Kong (CN); Massachusetts Institute of Technology, Cambridge, MA (US)

(72) Inventors: Renjie Zhou, Hong Kong (CN); Yanping He, Hong Kong (CN); Peter T. C. So, Boston, MA (US); Baoliang Ge, Somerville, MA (US); George Barbastathis, Boston, MA (US); Mo Deng, Cambridge, MA (US); Zahid Yaqoob, Cambridge, MA (US)

(73) Assignees: The Chinese University of Hong Kong, Hong Kong (CN); Massachusetts Institute of Technology, Cambridge, MA (US)

( * ) Notice: Subject to any disclaimer, the term of this patent is extended or adjusted under 35 U.S.C. 154(b) by 428 days.

(21) Appl. No.: 18/066,752

(22) Filed: Dec. 15, 2022

(65) Prior Publication Data

US 2023/0186558 A1 Jun. 15, 2023

Related U.S. Application Data

(60) Provisional application No. 63/361,396, filed on Dec. 15, 2021.

(51) Int. Cl.
*G06T 17/00* (2006.01)
*G02B 21/00* (2006.01)
(Continued)

(52) U.S. Cl.
CPC .......... *G06T 17/00* (2013.01); *G02B 21/0032* (2013.01); *G02B 21/008* (2013.01);
(Continued)

(58) Field of Classification Search
CPC . G06T 17/00; G06T 2210/41; G06T 2200/04; G06T 2200/08; G02B 21/0032;
(Continued)

(56) References Cited

U.S. PATENT DOCUMENTS 11,781,966 B2 * 10/2023 Zuo .................... G01N 15/0227 356/337
12,140,538 B2 * 11/2024 Robles .................. G01N 21/41
(Continued)

FOREIGN PATENT DOCUMENTS

CN 109907731 A 6/2019
CN 110799829 A 2/2020

OTHER PUBLICATIONS

Office Action dated Aug. 28, 2025 in Chinese Application No. 202211619922.1.

(Continued)

*Primary Examiner* — Michael S Osinski
(74) *Attorney, Agent, or Firm* — SALIWANCHIK, LLOYD & EISENSCHENK

(57) ABSTRACT

A SIngle-frame LAbel-free Cell Tomography (SILACT) system and methods are provided to reconstruct 3D Refractive Index (RI) distribution of cells at over 10,000 volumes/second while resolving subcellular compartments without fluorescence labelling. The SILACT includes a high-speed interference microscope with multiplex illumination and a fast reconstruction method utilizing a pre-trained physics-incorporating Deep Neural Network (DNN). With SILACT, it is demonstrated that 3D imaging cytometry at a throughput of over 20,000 cells/second can be achieved, and transient dynamics of Red Blood Cells (RBCs) undergoing shear-induced 3D deformation inside a microfluidic channel can be observed.

19 Claims, 29 Drawing Sheets

(51) Int. Cl.
*G06N 3/08* (2023.01)
*H04N 23/80* (2023.01)

(52) U.S. Cl.
CPC ............... *G06N 3/08* (2013.01); *H04N 23/80* (2023.01); *G06T 2210/41* (2013.01)

(58) Field of Classification Search
CPC ........ G02B 21/008; G06N 3/08; H04N 23/80; G01N 21/45; G01N 21/84; G01N 2201/10; G03H 1/0005; G03H 2001/005
See application file for complete search history.

(56) References Cited

U.S. PATENT DOCUMENTS

| | | | | |
|---|---|---|---|---|
| 2009/0125242 | A1* | 5/2009 | Choi | G01N 21/51 702/19 |
| 2010/0011268 | A1* | 1/2010 | Sinop | G06V 10/7715 714/E11.023 |
| 2013/0070251 | A1* | 3/2013 | Das | G03H 1/0866 356/457 |
| 2015/0324953 | A1* | 11/2015 | Salvador Marcos | G06T 3/4007 382/300 |
| 2019/0346668 | A1* | 11/2019 | Han | G02B 21/008 |
| 2020/0081236 | A1* | 3/2020 | Park | G02B 21/0084 |
| 2020/0182788 | A1* | 6/2020 | Shaked | G01N 15/1433 |
| 2020/0340798 | A1* | 10/2020 | Izatt | G06T 15/08 |
| 2021/0199586 | A1* | 7/2021 | Zhou | G01N 21/45 |
| 2021/0271060 | A1* | 9/2021 | Shroff | G02B 21/082 |
| 2022/0248960 | A1* | 8/2022 | Li | A61B 5/02007 |
| 2023/0199162 | A1* | 6/2023 | Chen | G02B 27/4227 348/49 |
| 2024/0053135 | A1* | 2/2024 | Equis | G01N 21/453 |
| 2024/0210158 | A1* | 6/2024 | Liang | G01B 11/2441 |
| 2025/0005942 | A1* | 1/2025 | Panetta | G06V 10/7715 |

OTHER PUBLICATIONS

Ge, B., "Single-shot quantitative interferometric microscopy for imaging high-speed dynamics", Massachusetts Institute of Technology, May 2021, pp. 1-136.
Boutros, M., et al., "Microscopy-Based High-Content Screening," Cell, 2015, 163:1314-1325.
Sung, Y., et al., "Optical diffraction tomography for high resolution live cell imaging," Optics Express, 2009, 17 (1):266-277.
Krutzik, P.O., et al., "Fluorescent cell barcoding in flow cytometry allows high-throughput drug screening and signaling profiling," Nature Methods, 2006, 3(5):361-368.
Lim, J., et al., "Comparative study of iterative reconstruction algorithms for missing cone problems in optical diffraction tomography," Optics Express, 2015, 23(13):16933-16948.
Krutzik, P.O., et al., "High-content single-cell drug screening with phosphospecific flow cytometry," Nature Chemical Biology, 2008, 4(2):132-142.
Kamilov, U.S., et al., "Learning approach to optical tomography," Optica, 2015, 2(6):517-522.
Newman, A.M., et al., "Determining cell type abundance and expression from bulk tissues with digital cytometry," Nature Biotechnology, 2019, 37:1-16.
Kamilov, U.S., et al., "Optical Tomographic Image Reconstruction Based on Beam Propagation and Sparse Regularization," IEEE Transactions on Computational Imaging, 2016, 2(1):59-70.
Porpiglia, E., et al., "High-resolution myogenic lineage mapping by single-cell mass cytometry," Nature Cell Biology, 2017, 19(5):1-16.
Ziemczonok, M., et al., "3D-printed biological cell phantom for testing 3D quantitative phase imaging systems," Scientific Reports, 2019, 9(18872):1-9.
Nitta, N., et al., "Intelligent Image-Activated Cell Sorting," Cell, 2018, 175:1-25.
He, K., et al., "Deep Residual Learning for Image Recognition," IEEE Conference on Computer Vision and Pattern Recognition (CVPR), 2016, pp. 770-778.
Park, Y., et al., "Measurement of red blood cell mechanics during morphological changes," PNAS, 2010, 107 (15):6731-6736.
Nguyen, T.H., et al., "Gradient light interference microscopy for 3D imaging of unlabeled specimens," Nature Communications, 2017, 8(210):1-9.
Hosseini, P., et al., "Cellular normoxic biophysical markers of hydroxyurea treatment in sickle cell disease," PNAS, 2016, 113(34):9527-9532.
Cui, X., et al., "Lensless high-resolution on-chip optofluidic microscopes for Caenorhabditis elegans and cell imaging," PNAS, 2008, 105(31): 10670-10675.
Rosendahl, P., et al., "Real-time fluorescence and deformability cytometry," Nature Methods, 2018, 15(5):1-11.
Qin, D., et al., "Soft lithography for micro- and nanoscale patterning," Nature Protocols, 2010, 5(3):491-502.
Zhang, W.Y., et al., "Elastomer-Supported Cold Welding for Room Temperature Wafer-Level Bonding," 17th IEEE International Conference on Micro Electro Mechanical Systems, 2004, pp. 741-744.
Urbanska, M., et al., "High-throughput single-cell mechanical phenotyping with real-time deformability cytometry," Methods in Cell Biology, 2018, 147:175-198.
Park, H.S., et al., "Quantitative phase imaging of erythrocytes under microfluidic constriction in a high refractive index medium reveals water content changes," Microsystems & Nanoengineering, 2019, 5(63):1-9.
Park, H.S., et al., "Invited Article: Digital refocusing in quantitative phase imaging for flowing red blood cells," APL Photonics, 2018, 3(110802):1-12.
Park, Y., et al., "Refractive index maps and membrane dynamics of human red blood cells parasitized by *Plasmodium falciparum*," PNAS, 2008, 105(37):13730-13735.
Coutu, D.L., et al., "Multicolor quantitative confocal imaging cytometry," Nature Methods, 2018, 15(1):1-12.
Choi, H., et al., "Three-Dimensional Image Cytometer Based on Widefield Stuctured Light Microscopy and High-Speed Remote Depth Scanning," Cytometry Part A Journal of the International Society for Advancement of Cytometry, 2015, 87A:49-60.
Han, Y., et al., "Review: imaging technologies for flow cytometry," Lab on a Chip, 2016, 16:4639-4647.
Lee, K.C.M., et al., "Quantitative Phase Imaging Flow Cytometry for Ultra-Large-Scale Single-Cell Biophysical Phenotyping," Cytometry Part A Journal of Quantitative Cell Science, 2019, 95A:510-520.
Cho, S.H., et al., "Review Article: Recent advancements in optofluidic flow cytometer," Biomicrofluidics, 2010, 4 (043001):1-24.
Gualda, E.J., et al., "Three-Dimensional Imaging Flow Cytometry Through Light-Sheet Fluorescence Microscopy," Cytometry Part A Journal of the Internaltional Society for Advancement of Cytometry, 2017, 91A:144-151.
Muller, M., "Introduction to Confocal Fluorescence Microscopy," SPIE Press, 2006, 69(2):1-131.
Power, R.M., et al., "A guide to light-sheet fluorescence microscopy for multiscale imaging," Nature Methods, 2017, 14(4):360-373.
Chen, B.-C., et al., "Lattice light-sheet microscopy: Imaging molecules to embryos at high spatiotemportal resolution," Science, 2014, 346(6208):1-14.
Shao, L., et al., "Super-resolution 3D microscopy of live whole cells using structured illumination," Nature Methods, 2011, 8(12):1-5.
Han, Y., et al., "Cameraless high-thoughput three-dimensional imaging flow cytometry," Optica, 2019, 6 (10):1297-1304.
Lim, J., et al., "High-fidelity optical diffraction tomography of multiple scattering samples," Science & Applications, 2019, 8(82):1-12.
Stehbens, S., et al., "Imaging Intracellular Protein Dynamics by Spinning Disk Confocal Microscopy," Methods in Enzymology, 2012, 504:293-313.
Bai, C., et al., "3D Imaging Restoration of Spinning-Disk Confocal Microscopy via Deep learning," IEEE Photonics Technology Letters, 2020, 32(18):1131-1134.

(56) References Cited

OTHER PUBLICATIONS

Auksorius, E., et al., "In vivo imaging of the human cornea with high-speed and high-resolution Fourier-domain full-field optical coherence tomography," Biomedical Optics Express, 2020, 11(5):2849-2865.

Yanny, K., et al., "Miniscope3D: optimized single-shot miniature 3D fluorescence microscopy," Science & Applications, 2020, 9(171): 1-13.

Adams, J.K., et al., "Single-frame 3D fluorescence microscopy with ultraminiature lensless FlatScope," Science Advances, 2017, 3(e1701548):1-10.

Iyer, R.R., et al., "Full-field spectral-domain optical interferometry for snapshot three-dimensional microscopy," Biomedical Optics Express, 2020, 11(10):5903-5919.

Boddington, S.E., et al., "Labeling Human Mesenchymal Stem Cells with Fluorescent Contrast Agents: the Biological Impact," Molecular Imaging and Biology, 2011, 13:3-9.

Ganini, D., et al., "Fluorescent proteins such as eGFP lead to catalytic oxidative stress in cells," Redox Biology, 2017, 12:462-468.

Sung, Y., et al., "Size homeostasis in adherent cells studied by synthetic phase microscopy," PNAS, 2013, 110 (41):16687-16692.

Choi, W., et al., "Tomographic phase microscopy," Nature Methods, 2007, 4(9):717-719.

Kim, T., et al., "White-light diffraction tomography of unlabelled live cells," Nature Photonics, 2014, 8:256-263.

Jin, D., et al., "Dynamic spatial filtering using a digital micromirror device for high-speed optical diffraction tomography," Optics Express, 2018, 26(1):428-437.

Jin, D., et al., "Tomographic phase microscopy: principles and applications in bioimaging [Invited]," Journal of the Optical Society of America B, 2017, 34(5):B64-B77.

Wang, H., et al., "Deep learning enables cross-modality super-resolution in fluorescence microscopy," Nature Methods, 2019, 16:1-17.

Li, S., et al., "Spectral pre-modulation of training examples enhances the spatial resolution of the phase extraction neural network (PhENN)," Optics Express, 2018, 26(22):29340-29352.

Goy, A., et al., "Low Photon Count Phase Retrieval Using Deep Learning," Physical Review Letters, 2018, 121 (243902):1-5.

Ounkomol, C., et al., "Label-free prediction of three-dimensional fluorescence images from transmitted-light microscopy," Nature Methods, 2018, 15:1-9.

Kim, K., et al., "High-resolution three-dimensional imaging of red blood cells parasitized by *Plasmodium falciparum* and in situ hemozoin crystals using optical diffraction tomography," Journal of Biomedical Optics, 2014, 19(1):1-13.

Deng, M., et al., "Learning to synthesize: robust phase retrieval at low photon counts," Science & Applications, 2020, 9(36):1-16.

Li, S., et al., "Imaging through glass diffusers using densely connected convolutional networks," Optica, 2018, 5 (7):803-813.

Candes, E.J., et al., "Stable Signal Recovery from Incomplete and Inaccurate Measurements," Communications on Pure and Applied Mathematics, 2006, LIX:1207-1223.

Donoho, D.L., "Compressed Sensing," IEEE Transactions on Information Theory, 2006, 52(4):1289-1306.

Brady, D.J., "Optical Imaging and Spectroscopy," Optical Society of America, 2008, pp. 1-517.

Panigrahi, S., et al., "A Survey on Transfer Learning," Intelligent and Cloud Computing, Smart Innovation, Systems and Technologies, 2021, 194:781-789.

Bird, R.B., et al. "Transport Phenomena," 2006, 2:1-910.

* cited by examiner

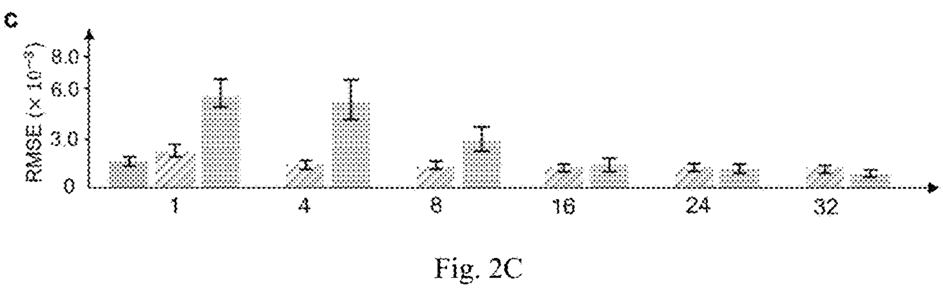
Fig. 2C
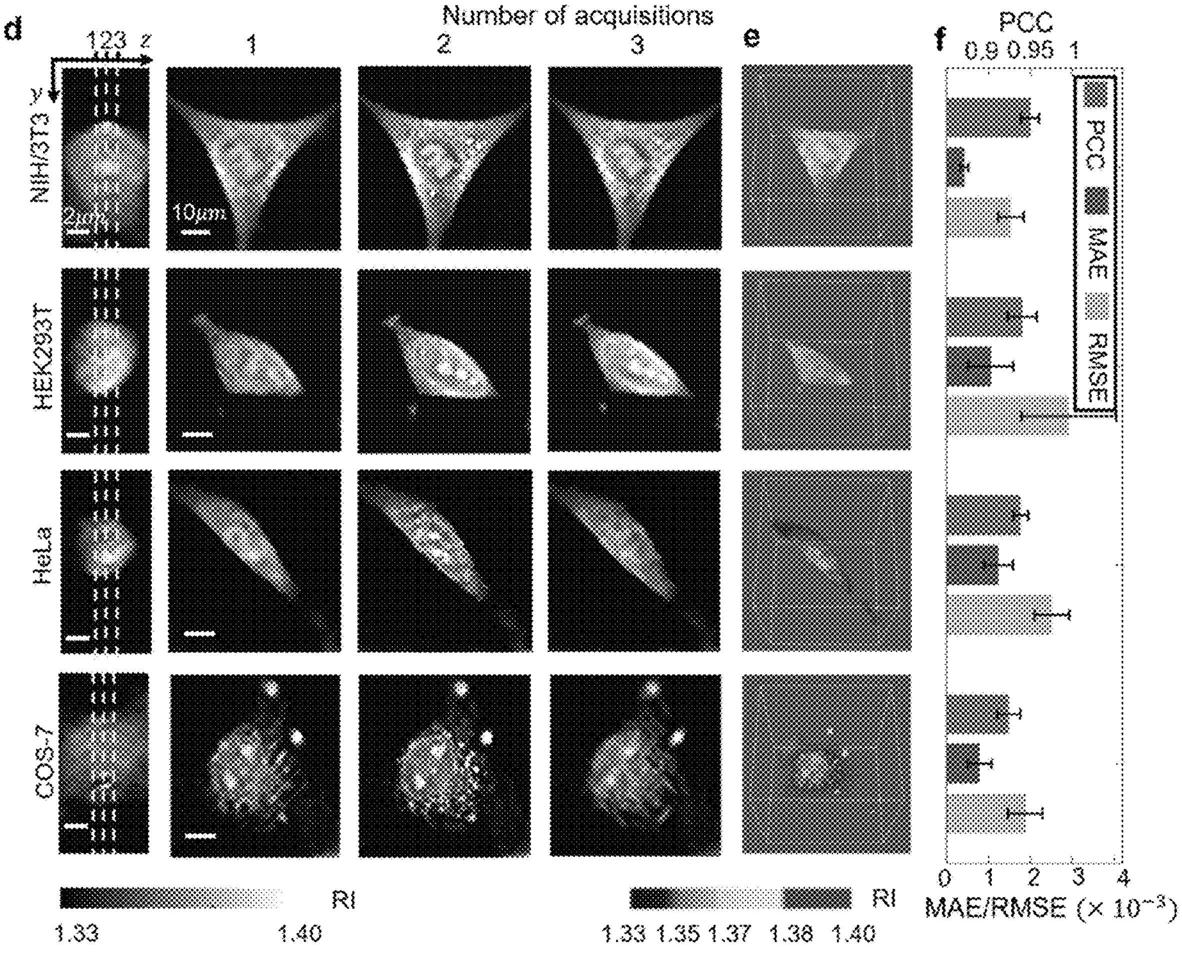
Fig. 2D-F a 1
0.95
0.9
0.85
0.8
0.75
PCC
NPCC trained
MAE trained
NIH/3T3
HEK293
HeLa
COS-7
Cell species (a) Photomask Cr/Au (b) Spin coat photoresist (AZ4620)

(c) UV exposure (d) Develop and coat TOFC silane (e) Spin coat PDMS gel and cure (f) Place pre-made PDMS block (g) Release bonded PDMS from master (h) Punch holes (inlet/outlet)

(i) PDMS-glass plasma bonding (j) Cross-sectional view

HIGH SPEED SINGLE-FRAME LABEL-FREE CELL TOMOGRAPHY

CROSS-REFERENCE TO RELATED APPLICATION

This application claims the benefit of U.S. Ser. No. 63/361,396, filed Dec. 15, 2021, which is hereby incorporated by reference in its entirety including any tables, figures, or drawings.

BACKGROUND OF THE INVENTION

High-throughput and high-content cell phenotyping has been widely applied in drug screening[1-3], clinical testing[4], and regenerative medicine[5], involving rapid quantification of morphological, mechanical, and other biophysical properties such as dry mass and nucleus size of large cell populations[6]. Some of these cellular properties may serve as important biomarkers for characterizing their physiological and pathological states[7-9]. For example, by quantifying population composition changes of leukocytes based on their morphology, one may find indicators for immune systems failure or the presence of infectious diseases[10]. Similarly, mechanical parameters extracted from measuring membrane fluctuations or deformations of red blood cells (RBCs)[7,11-13] have been deployed as biophysical biomarkers to investigate the etiology of malaria[14] and sickle cell disease[8]. Further advances in high-speed live cell analysis assays that may extract these cellular properties more effectively and noninvasively can broadly impact many areas of biomedical investigations and clinical applications.

Imaging cytometry[15-18] has recently emerged as a powerful tool for high-content analysis in cell-based assays. A throughput of over 100,000 cells/second has been achieved using two-dimensional (2D) imaging approaches[18,19]. As living cells have complex three-dimensional (3D) structures, 2D imaging methods are limited in revealing their intracellular structures and quantifying cellular morphologies as comprehensively and accurately as their 3D counterparts[15,16,20] (for example, confocal microscopy[21], light-sheet microscopy[22,23], and structured illumination microscopy[24]). However, there are several limitations in these 3D imaging methods that prevent them from realizing high-throughput and noninvasive measurements of living cells. Firstly, since 3D methods[20,25] usually require long-time scanning and extensive data processing[26], their throughput is generally limited to <1,000 cells/second[16,25] even with faster scanning hardware[27-29] and more effective reconstruction algorithms[30-32]. Secondly, many mainstream 3D imaging methods are fluorescence-based, thereby phototoxicity and photobleaching may alter cellular structures, complicate observation results[33,34], and hinder long-term visualization of cells[35].

BRIEF SUMMARY OF THE INVENTION

There continues to be a need in the art for improved designs and techniques for 3D imaging systems and methods for reconstructing 3D Refractive Index (RI) distribution of cell samples at a high speed while resolving subcellular compartments without fluorescence labelling.

According to an embodiment of the subject invention, a single-frame label-free cell tomography (SILACT) system for reconstructing 3D RI value distribution of cell samples is provided. The SILACT system comprises an interferometric microscope device with angle-multiplexing optics to capture one or more interferograms of the cell samples and a machine-learning (ML) engine configured to reconstruct a 3D RI map of the cell samples based on the one or more interferograms captured. The ML engine is configured to compensate for missing spatial frequency information. For each cell sample, the interferometric microscope device is configured to acquire a plurality of sequential interferograms of the cell sample, each by scanning from a single scanning illumination angle; and acquire a multiplex single-frame interferogram of the cell sample by scanning the cell sample simultaneously with a plurality of beams having the same elevation angle and different azimuthal angles. The different azimuthal angles include 0°, 90°, 180°, and 270°. The ML engine comprises an interferogram pre-process unit configured to pre-process the interferogram(s) received from the interferometric microscope device and a 3D reconstruction unit receiving outputs of the interferogram pre-process unit and configured to reconstruct the 3D RI map and recover the RI values by linear fitting steps.

The interferogram pre-process unit is configured to pre-process the plurality of sequential interferograms received from the interferometric microscope device to generate a ground truth 3D RI map of the cell sample by physical-model based reconstruction steps and pre-process the multiplex single-frame interferogram received from the interferometric microscope device to extract a plurality of Phase Approximants by spatial filtering steps. The 3D reconstruction unit is configured to train a Deep Neural Network (DNN) based on the ground truth 3D RI map and the plurality of Phase Approximants generated by the interferogram pre-process unit to reconstruct the 3D RI map of the cell samples. Moreover, the physical-model based reconstruction steps are based on Learning Tomography Beam Propagation Method (LT-BPM) and the reliability of the physical-model based reconstruction steps is validated by calibration of calibration cell samples. The calibration cell samples include polystyrene beads or 3D printed cell phantoms. Further, the DNN model is based on a Learning to Synthesize by DNN (LS-DNN) method and the DNN model is trained to minimize Negative Pearson Correlation Coefficient (NPCC) loss between the ground truth RI map and output of the DNN model. In addition, the cell samples comprise NIH/3T3 cell samples. The ground truth 3D RI map comprises 100 layers along a z-direction, adjacent layers have an interval of 0.21 μm between them, a portion of the cell samples are confined to a small axial dimension with $|z| \leq 8$ μm that is equivalent to 80 layers, and within cell support, most organelles are located at layers $|z| \leq 6$ μm, where high frequencies are of the highest significance.

In certain embodiments of the subject invention, an interferometric microscope system and method for single-frame label-free cell tomography (SILACT) that can reconstruct three-dimensional (3D) refractive index (RI) distributions of cell samples is provided. The imaging system comprises an illumination source illuminating light; a 1×2 single-mode fiber coupler (SMFC) receiving the light from the illumination source and dividing the light into two beams, one of the two beams being a reference beam for interferometric detection, while the other beam being a sample beam directed to a sample; a first lens collimating the sample beam received from the SMFC; a first digital micromirror device (DMD) receiving the collimated sample beam from the first lens and configured to display Lee hologram patterns comprising multiple diffracted plane waves; a second lens receiving the sample beam from the first DMD, and configured to enable the sample beams to form a series of diffraction spots at a Fourier plane; a second DMD disposed at the Fourier plane and being loaded with filter mask patterns to block spurious diffraction orders and only allow downstream desired 1$^{st}$ diffraction order; a third lens receiving the sample beam from the second DMD and collimating the sample beam; a first 4f system comprising a fourth lens and a first objective lens, magnifying an angular range of the sample beam received from the third lens and transmitting the sample beam to the sample; a second objective lens and a fifth lens collecting the sample beam scattered by the sample; a beam splitter (BS) receiving the reference beam from the SMFC and collecting the scattered light received from the fifth lens and combining the sample beam and the reference beam into a multiplex interferogram; and a second 4f system comprising a sixth lens and a seventh lens, spatially magnifying the multiplex interferogram.

In another embodiment of the subject invention, a Learning to Synthesize by DNN (LS-DNN) method for reconstructing 3D RI value distribution of cell samples is provided. The method comprises splitting spectral information into a high-frequency band and a low-frequency band; processing the high-frequency band and low-frequency band separately; and recombining the processed high-frequency band and the processed low-frequency band. The step of separately processing the high band and low band comprises training a first one DNN model to process the high-frequency band; training a second DNN model to process the low-frequency band; and training a third DNN model to recombine output of the processed high-frequency band and the processed low-frequency band for compensated reconstruction exhibiting even fidelity at all frequency bands.

BRIEF DESCRIPTION OF THE DRAWINGS

FIGS. 1A-1B are schematic diagrams showing the overall working principle of SILACT, wherein FIG. 1A shows the pipeline of 3D time-lapse imaging by SILACT comprising two principal steps: image capturing by an interferometric microscope and 3D RI inference with a pre-trained machine learning engine; wherein FIG. 1B shows the training process of the machine learning engine, FIG. 1B comprising 1B(i) showing the acquisition of all 49 interferograms captured under the angle-scanning illumination scheme used for the generation of ground truth RI maps, 1B(ii) illustrating the acquisition process of the multiplex interferogram, 1B(iii) showing the upper stream illustrating how the ground truth RI maps are prepared using a physical-model based reconstruction (LT-BPM) algorithm; the lower stream showing how the four Phase Approximants are estimated from the multiplex interferogram; in the middle, the ground truth RI maps, and four Phase Approximants (inputs) are used for the training of the Deep Neural Network (DNN), according to an embodiment of the subject invention.

FIGS. 2A-2C show plot diagrams of evaluation of SILACT's performance, wherein comparisons of quantitative metrics are shown in FIG. 2A (PCC), FIG. 2B (MAE), and FIG. 2C (RMSE for LT-BPM, MDODT, and SILACT as a function of the number of acquisitions); wherein FIGS. 2D-2F show results of visualization and quantitative evaluation of predicted RI maps of NIH/3T3 cells, HEK293T cells, HeLa cells, and COS-7 cells obtained by the SILACT method, wherein the first column of FIG. 2D shows the cross-sections of the 3D RI map on y-z plane; The x-y cross-sections at different z locations (1) $z_0-1$ μm, (2) $z_0$ and (3) $z_0+1$ μm (identified with yellow dashed lines in the first column, where $z_0$ indicates the central plane) are shown in the second to fourth columns of FIG. 2D, respectively, 3D rendering of the RI maps is shown in FIG. 2E, the same quantitative metrics as in FIGS. 2A-2C are shown in FIG. 2F according to an embodiment of the subject invention.

FIG. 3A-3G demonstrate SILACT as a high-throughput and high-content 3D imaging flow cytometer, with 3D rendering of the imaged of FIG. 3A (NIH/3T3 cells), FIG. 3B (Jurkat T cells), and FIG. 3C (mouse RBCs) at different time points as they flow through the channel, respectively, wherein the flow velocities of the NIH/3T3 cells, Jurkat T cells, and mouse RBCs are 0.46 m/sec, 0.31 m/sec and 0.33 m/sec, respectively, and the imaging speed is 12.5 k vps; wherein FIG. 3D shows scatter plots of surface area vs. volume, FIG. 3E shows scatter plots of volume vs. dry mass, FIG. 3F shows scatter plots of volume/surface area ratio vs. mean RI, and FIG. 3G shows scatter plots of mean RI vs. dry mass, wherein the data from NIH/3T3 cells, Jurkat T cells, and mouse RBCs are shown with blue dots, orange dots, and red dots in FIG. 3E-3G, according to an embodiment of the subject invention.

FIGS. 4A-4B show single-frame 3D imaging of RBC deformation in a microfluidic channel, wherein FIG. 4A shows 3D rendering of the microfluidic channel and the flowing RBCs at time points of 0.1, 0.6, 1.2, 1.5, 2.1 and 2.7 ms, wherein FIG. 4B shows variation of eccentricity of one single cell over time (0-2.7 ms), wherein the 3D rendering of the selected cell's RI maps at 0.1, 0.6, 1.2, 1.5, 2.1, and 2.7 ms are embedded into these figures according to an embodiment of the subject invention.

FIGS. 5A-5C show graphical depiction of technical details of the SILACT system and method, wherein FIG. 5A shows system design of SILACT and illustration of single illumination and multiplex illumination, wherein FIG. 5B shows pipeline of the spatial filtering method for acquiring the Phase Approximants, wherein FIG. 5C shows a flow chart of a two-step training process for LS-DNN, according to an embodiment of the subject invention.

FIGS. 6A-C show determination of the optimum spectral filter size for retrieving the Phase Approximants of each illumination angle, wherein FIG. 6A illustrates the illumination angle pattern at the back focal plane of objective lens 1 (OL1), the green and red dots showing all the illumination angles used in the angle-scanning scheme, while the red dots showing the four illumination angles used in the angle-multiplexing scheme, wherein FIGS. 6B-6C show the PCC and MAE values when the spectral filter size $k_f$ is 0.3-0.8 $k_c$, respectively, according to an embodiment of the subject invention.

FIGS. 8A-8E show comparison results of different ODT reconstruction methods on a cell phantom, wherein FIGS. 8A-8C show the reconstructed 3D RI maps of the cell phantom with Rytov ODT without regularization, Rytov ODT with regularization, and LT-BPM, respectively, wherein the cross-section of the y-z plane and the x-y cross-sections in different layers are shown, Δz is the difference between the shown layer and the bottom layer of the cell phantom, wherein FIG. 8D shows the ground truth 3D RI maps of the cell phantom, wherein FIG. 8E shows the quantitative evaluations of different reconstruction methods' performance with MAE, RMSE, and PCC when compared with the ground RI maps, wherein the scale bars denote 10 μm, according to an embodiment of the subject invention.

FIGS. 9A-9B show the basic architecture of machine learning engine, wherein FIG. 9A shows the general structure for the U-Net with residual blocks and FIG. 9B shows detailed structures for down-residual blocks (DRB), up-residual blocks (URB), and residual blocks (RB), wherein superscripts a-d denote different kernel sizes and strides, listed as follows: a) Kernel size: (3, 3), strides: (2, 2), b) Kernel size: (3, 3), strides: (1, 1), c) Kernel size: (2, 2), strides: (2, 2), and d) Kernel size: (1, 1), strides: (1, 1), according to an embodiment of the subject invention.

FIGS. 10A-10D show comparison results of visualized results with different reconstruction methods, wherein y-z cross-sections, and x-y cross-sections at z locations (1) $z_0-1$ μm, (2) $z_0$ and (3) $z_0+1$ μm of NIH/3T3 cells, HEK293 cells, HeLa cells, and COS-7 cells are shown in FIGS. 10A-10D, respectively, wherein $z_0$ indicates the central plane, the different z locations are also labeled with yellow dashed lines in y-z cross-sections, the scale bar in the x-y plane is 10 μm, and the scale bar along the z-axis is 2 μm, according to an embodiment of the subject invention.

FIGS. 11A-11C show results of quantitative evaluation of SILACT's reconstruction with different training loss metrics, wherein FIGS. 11A-11C show the PCC, MAE loss, and RMSE loss of the ground truth RI map (LT-BPM reconstruction with 49 angles) and the RI map reconstructed with our trained DNN on the dependence of different cell species, respectively, wherein the DNN model used for producing the RI map is trained with a dataset of NIH/3T3 cells, wherein the blue bars show the results of the DNN trained with NPCC loss function, while the red bars demonstrate the results of the MAE loss function trained DNN model, according to an embodiment of the subject invention.

FIGS. 12A-12E show results of comparison of performances of the NIH/3T3 cell trained model and RBC trained model on the deformed RBCs in the microfluidic channel underflow, wherein FIG. 12A shows the 3D rendering of the selected cell's RI maps predicted by the NIH/3T3 cell trained model and the RBC trained model at 0, 1, 1.9, and 2.7 ms, wherein the scale bar denotes 10 μm, wherein FIGS. 12B and 12C show the MAE and PCC between the ground truth and prediction results on tested RBC cells with NIH/3T3 cell trained model and RBC trained model, wherein 12D and 12E show the comparison of the eccentricity and volume over time of the deformed RBC when predicted with NIH/3T3 cell trained and RBC trained models, wherein scale bar is 10 μm, according to an embodiment of the subject invention.

FIGS. 13A-13J show fabrication procedures of the PDMS microfluidic chip, wherein FIG. 13A shows design of the microfluidic channel on Cr/Au photomask, wherein FIG. 13B shows spin coat positive photoresist (AZ 4620 or SU8-3050) on a 4" silicon wafer, FIG. 13C shows the coated photoresist under UV to through the photomask to transfer the pattern on the wafer, FIG. 13D shows development of exposed photoresist and treating the surface of master mold with TOFC silane, FIG. 13E shows spin coat PDMS gel on the master mold and cure, FIG. 13F shows lace pre-made PDMS block on the inlet and outlet region of the thin PDMS film and bond with plasma activation, wherein FIGS. 13G-13I show releasing the PDMS from master mold, punch inlet, and outlet holes, and finally seal with a No. 1 cover glass, wherein FIG. 13J shows an overview of the PDMS microfluidic chip, according to an embodiment of the subject invention.

FIGS. 14A-14F show assembling of the microfluidic chip with ODT, wherein FIG. 14A shows thickness of the prepared microfluidic chip to ensure the placement in between the two objective lenses, wherein FIG. 14B shows a microfluidic chip inserted between the two objective lenses of the ODT system, wherein FIGS. 14C-14E show the microfluidic channels for NIH/3T3 cells, Jurkat T cells and Mouse RBCs, respectively, the widths and heights are shown in each subfigure, wherein FIG. 14F shows the design of the microfluidic channel for deformation measurements of RBCs, wherein the left region is wider, the shear rate of the cell is lower, while the right region is narrower with a higher shear rate, according to an embodiment of the subject invention.

DETAILED DISCLOSURE OF THE INVENTION

Figure 1A:
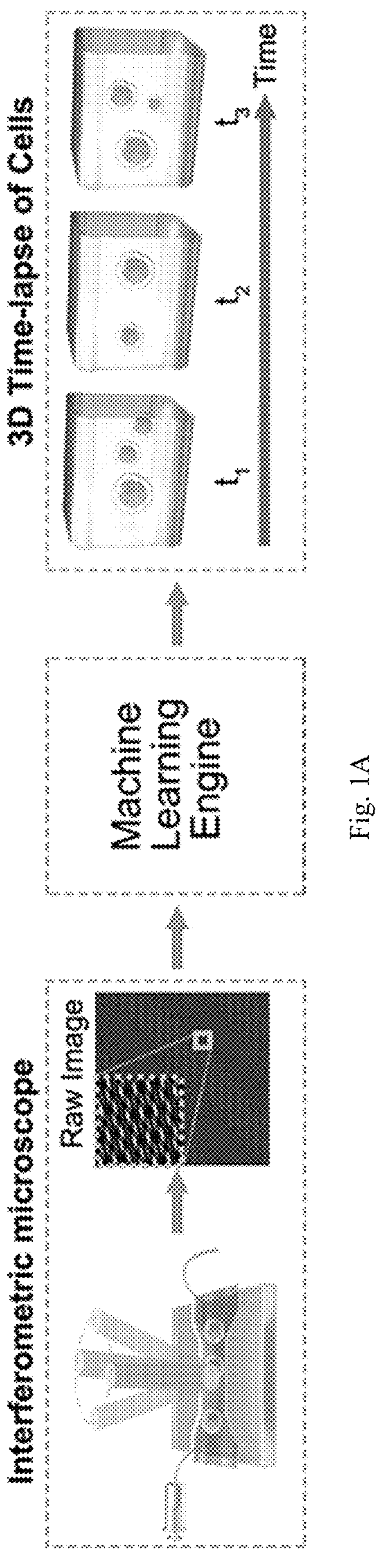

The embodiments of the subject invention pertain to a single-frame label-free cell tomography (SILACT) system and method for reconstructing 3D refractive index (RI) distribution of cells.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A "SIngle-frame LAbel-free Cell Tomography" (SILACT) system and method is provided to meet the demand for high-throughput 3D cytometry, The essence of SILACT is optical diffraction tomography (ODT) that maps the 3D RI distributions of specimens from the measured scattered electric fields, corresponding to scanning from multiple illumination angles (>50) or different sample depth positions, using an inverse scattering model[36-39]. In the SILACT, single-frame image acquisition is enabled by multiplexing four illumination angles into one interferogram. A fast 3D reconstruction algorithm based on a pre-trained physics-incorporating DNN is adopted to reliably reconstruct the 3D RI maps of cells with high spatial resolution. Such machine learning driven computational imaging approaches have recently been applied to super-resolution imaging[40], image phase retrieval[41], low-photon imaging[42], virtual staining of biopsy specimens[43].

The SILACT enables cytometry at a speed greater than 10,000 volumes/second (vps). Operating SILACT as a flow cytometer while a throughput of 17,500 cps has been achieved for RBCs, and 5,850 cps is approached for NIH/3T3 cells. For all cell types, the distributions of morphological and biophysical parameters are extracted in seconds. Furthermore, the potential of SILACT for measuring cell mechanical properties is showcased by characterizing transient 3D deformations of RBCs under shearing in a microfluidic channel.

2. Theory & Results 2.1 Overview of SILACT

The overall pipeline of SILACT, illustrated in FIG. 1A, contains two key components: (i) an interferometric microscope with angle-multiplexing optics that simultaneously illuminates the samples from four angles; and (ii) a Machine-Learning (ML) engine that converts a single interferogram containing four illumination angles of the cells to a 3D RI map, while compensating for missing spatial frequency information due to the use of only a few illumination angles. Since SILACT acquires volumetric information from a single 2D interferogram, the volumetric imaging rate is only limited by the camera frame rate and the number of photons received. With a high-speed camera and adequate illumination that is safe for the cells, a 3D acquisition speed higher than 10,000 vps can be readily obtained.

In SILACT, an off-axis interferometric microscope design is implemented as demonstrated in other angle-scanning ODT methods[36,44]. Multiplexing four illumination angles for single-frame 3D imaging is achieved by overlapping multiple Lee hologram patterns on a digital micro-mirror device (DMD). In the following sections, the utilization of four angles is shown to strike a good balance between acquisition time and reconstruction fidelity. The details of the imaging system design are elaborated in Methods, Section 4.1.

Figure 1B:
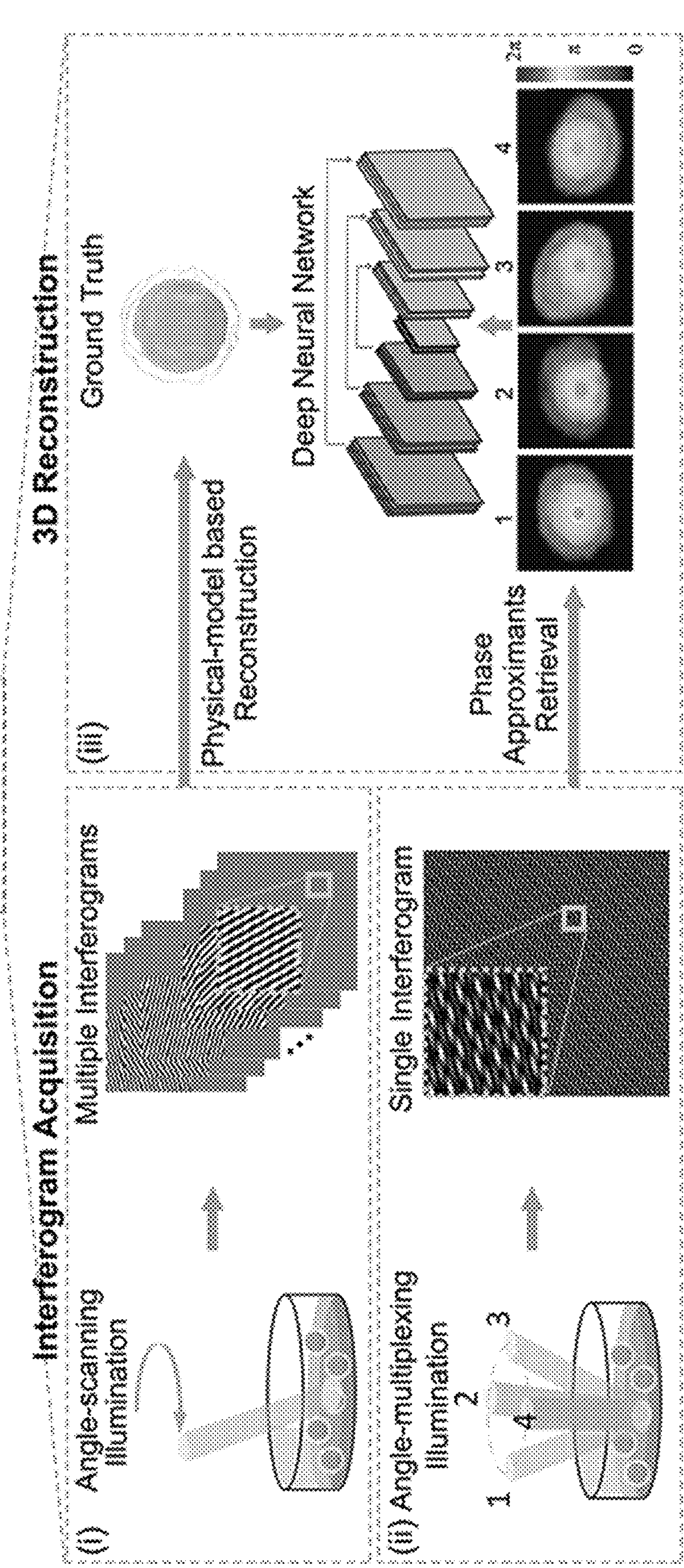

The ML engine reconstructs the 3D RI map of the sample as follows. First, the raw multiplex interferogram is preprocessed through a spatial filtering method to extract four Phase Approximants (see Methods, Section 4.2 and Supplementary Materials, Section 51), which are essentially approximations of the quantitative phase delay accrued after the light has gone through the sample at each corresponding angle. The Phase Approximants are then input to a pre-trained DNN model as shown in FIG. 1B (iii)) to reconstruct the 3D RI maps. Thereafter, a linear fitting procedure is applied to recover the RI values (see Methods, Section 4.3).

The central part of the SILACT system and method is the supervised training scheme for the ML engine. First, a dataset is constructed for training and testing the DNN model as shown in FIGS. 1B (i) and (ii). For each cell, two types of raw data are acquired with the interferometric microscope-based imaging platform: (i) 49 sequential interferograms, each from a single scanning illumination angle; and (ii) a single-frame interferogram from illuminating the sample simultaneously with four beams with the same elevation angle and azimuthal angles at 0°, 90°, 180°, and 270° (refer to Supplementary Materials, Section S1 for details on the angle scanning patterns in each data type). Acquisition (i) is used to obtain the ground truth 3D RI maps of the cells for training, whereas acquisition (ii) is the normal operating mode of SILACT as described earlier.

Then, the ground truth 3D RI maps are produced from acquisition (i) as follows: firstly, phase maps corresponding to each illumination angle are retrieved based on the Fourier transform method. The 49 phase maps are then used to reconstruct 3D RI maps based on the Learning Tomography Beam Propagation Method (LT-BPM)[45,46] (see Supplementary Material, Section 2). The reliability of LT-BPM as ground truth is validated by calibration samples, including polystyrene beads and 3D printed cell phantoms (see Supplementary Materials, Sections S3). The DNN model is based on the Learning to Synthesize by DNN (LS-DNN)[47] principle, which is generalized for 3D RI reconstruction (see Methods, Section 4.3). The supervised training procedure minimizes the Negative Pearson Correlation Coefficient (NPCC) loss[48] between the ground truth RI map and the output of the LS-DNN when its input is the Phase Approximants. The choice of NPCC is designed to further ensure the preservation of the sample's fine features. The key contribution of the LS-DNN scheme is to combat the uneven fidelity of low and high spatial frequencies that often occurs in DNN training[41]. Thus, the spatial resolution of the final 3D RI maps can be greatly improved.

The DNN is trained with 900 pairs of ground truth RI maps and corresponding Phase Approximants extracted from raw multiplex interferograms of NIH/3T3 cells. The NIH/3T3 cells used for training are cultured on glass-bottom well plates. As the angular scanning speed is 5000 $second^{-1}$ and 49 angles are exploited for reconstruction, the cells are considered static during this data acquisition process. The ML-engine's ability to generalize beyond its training to different cell types is discussed further in Section 2.3. Moreover, after training, SILACT's ML engine is fast in inferring the 3D RI map from Phase Approximants, taking only 0.68 second/volume on average (refer to Supplementary, Section S5 for detailed analysis of computational time and comparison with exiting 3D RI reconstruction methods).

2.2 Quantitative Validation of SILACT

Figure 2A:
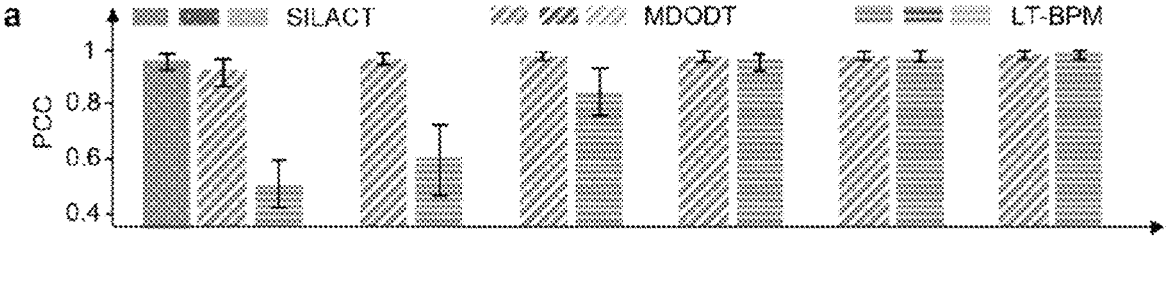
Figure 2B:
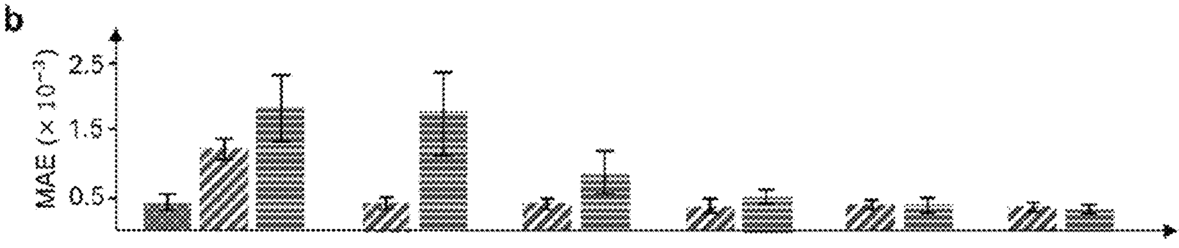

The validation of the design choices, namely: (1) the extent to which the number of angle-scanning measurements is compressed with deep learning, and (2) the feasibility of multiplexing four illumination angles in one interferogram acquisition is discussed below. The performance of LT-BPM, that is, the physical model for acquiring the ground truth RI maps, with sequentially scanning illumination angles drops dramatically when image acquisition number decreases from 32 to 1 as shown in FIGS. 2A-C, where Pearson Correlation Coefficient (PCC), Mean Absolute Error (MAE), and Root Mean Square Error (RMSE) are used for quantitative assessments by comparing with 49-angle LT-BPM. The loss of fidelity can be mitigated by applying deep learning. By pre-training a DNN using ground truth RI maps from LT-BPM with 49 scanning angles, the 3D RI maps of cells with compressed measurements are predicted. The method is termed "Multi-frame Deep-learning ODT" (MDODT) (see Supplementary Materials, Section S4). Even with only four scanning angles or four acquisitions, MDODT reconstruction results are almost indistinguishable from that of 32 image acquisitions with LT-BPM. However, reducing the number of illumination angles to one significantly deteriorates the performance.

Four illumination angles are multiplexed into one interferogram using a digital micromirror device (DMD) in an angle-scanning interferometric microscope. With only one acquisition, it is determined that the imaging performance is similar to that of MDODT when the number of imaging acquisitions is four, as shown in FIGS. 2A-2C. Therefore, the choice of multiplexing four illumination angles in SILACT is well justified. It is noted that multiplexing more than four illumination angles in SILACT may achieve similar performance, but this will require a new set of training data and re-training of the DNN.

2.3 SILACT Generalizability: 3D RI Maps of Diverse Cell Species

3D RI maps of various cell species are reconstructed with SILACT and are shown in FIGS. 2D-2E. The y-z sections at the origin of the x-axis and x-y cross-sections at the center layer and layers located ±1 μm above and below are shown in different columns in FIG. 2D. In FIG. 2E, the nucleoli, the nuclei's boundaries, and other organelles are readily distinguishable in the 3D renderings. Comparisons between SILACT reconstructions and corresponding ground truth reconstructions of various species of cells demonstrate the accuracy of SILACT (refer to Supplementary Material, section S6).

By applying this algorithm to other cell types and evaluating SILACT's reconstruction performance on different cell species, the generalizability of the approach can be assessed. From the testing results measured with PCC, MAE, or RMSE, it is determined that the generalization performance on several other similar eukaryotic cell species (HEK293T, HeLa, COS-7 cells) is comparable to the testing results of NIH/3T3 cells. The same applies when SILACT is tested on RBCs, a very different cell type without nuclei and organelles, as shown in Supplementary Material, section S9. The ability to generalize to other types of cells is remarkable, especially given that the ML engine is trained on only about 900 NIH/3T3 cells.

2.4 High-Throughput and High-Content 3D Imaging Flow Cytometry

Figure 3A:
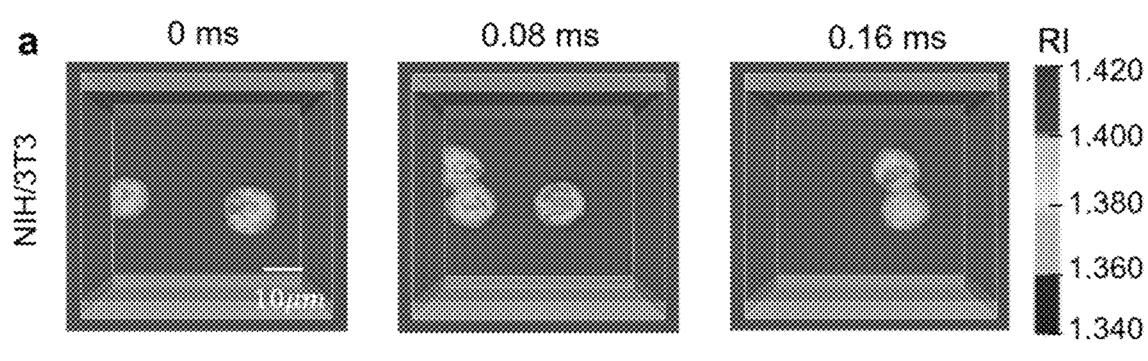
Figure 3B:
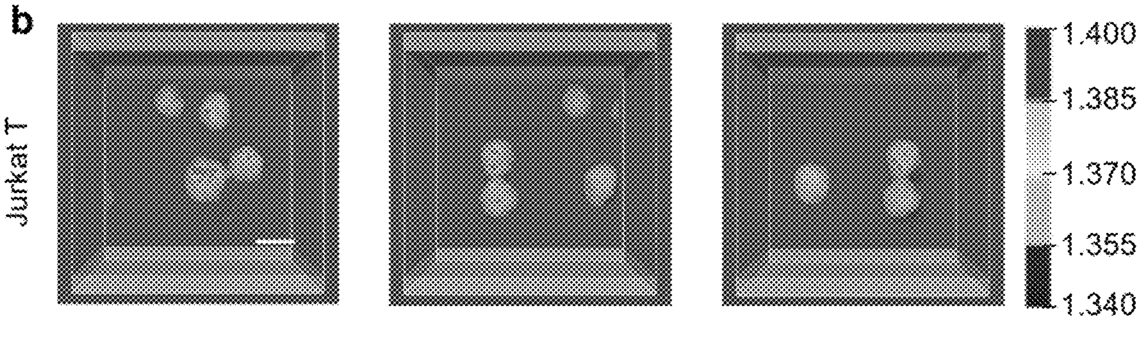
Figure 3C:
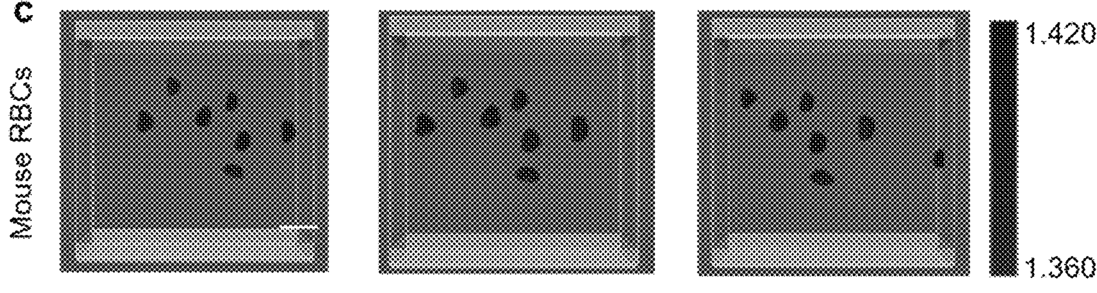

To operate SILACT in 3D imaging flow cytometer mode, a high-speed CMOS camera (Photron, Fastcam SA-X2) and microfluidic devices are incorporated (see Supplementary Material, Section S10). The speed of imaging that yields full 3D RI maps is 12,500 vps with 10-15 μs exposure time. The utility of the system is demonstrated based on three specimens: NIH/3T3 cells, Jurkat T cells, and mouse RBCs. The NIH/3T3 cells suspension at $20\times10^6$ cells/mL, the Jurkat T cells suspension at $90\times10^6$ cells/mL, and the mouse RBC suspension at $100\times10^6$ cells/mL are injected into the microfluidic channel of rectangular cross-section (see FIGS. 14C-14E) at a flow velocity of 0.46 m/sec, 0.31 m/sec, and 0.56 m/sec, respectively. 3D renderings of RI maps at different time points for flowing NIH/3T3 cells, Jurkat T cells, and mouse RBCs are shown in FIGS. 3A-3C, respectively. A total of 936 NIH/3T3 cells are acquired within 160 ms, i.e., a throughput of approximately 5,850 cells/second, and rendered into a time-lapse video. The Jurkat T cells and mouse RBCs are prepared at a higher cell density. For Jurkat T cells, 3,350 cells are captured in a video of a time duration of 160 ms. In the meanwhile, within 80 ms of recording, 1,400 RBCs are captured. Namely, a throughput of approximately 20,940 cells/second for Jurkat T cells and 17,500 cells/second for mouse RBCs are obtained, respectively.

Figure 3D:
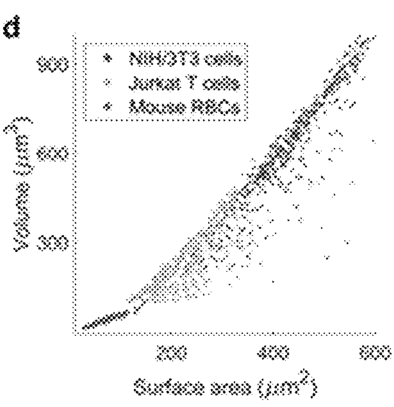
Figure 3E:
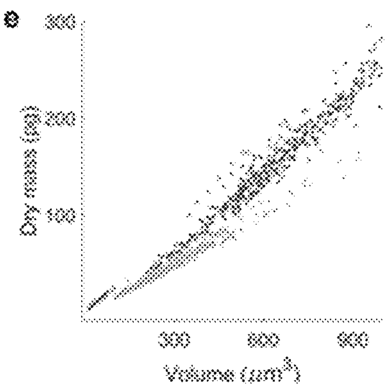
Figure 3F:
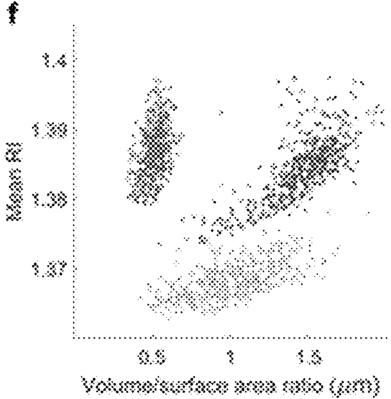
Figure 3G:
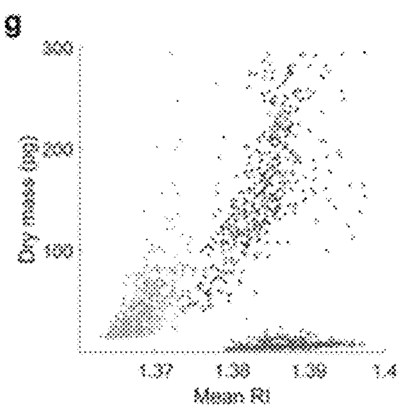

By segmenting the cells from their 3D RI maps, multiple morphological and biophysical parameters, as well as the dry mass that reflects the total cell protein content are extracted. The distributions of these quantities in the entire cell population can be subsequently used for cell characterization and classification. The mean RI, volume, surface area, and dry mass of these cells are extracted and their distributions using these parameters are explored. The total numbers of NIH/3T3 cells, Jurkat T cells, and mouse RBCs used for analysis are both 500 cells randomly chosen from the population of cells captured in the 3D time-lapse videos. From volume & surface area distribution as shown in FIG. 3D, the results of comparison of three imaged cell species' sizes demonstrate that the mouse RBCs have the smallest cell sizes, the Jurkat T cells' sizes are in intermediate, while NIH/3T3 cells are the largest. Furthermore, it is noted that the mouse RBCs and the Jurkat T cells are more concentrated in a narrow region than the NIH/3T3 cells. Such a difference is expected as NIH/3T3 cells may come at different growth stages, while RBCs and Jurkat T cells are mature cells possessing more uniformly distributed cell sizes. In FIG. 3E, the dry mass & volume distribution is plotted, where the three cell types are well separated. The linear relationships of dry mass vs. volume indicate that NIH/3T3 cells and mouse RBCs have similar RI mean values, while Jurkat T cells' RI values are slightly lower. To further characterize the cell shapes, the correlations between explored mean RI and volume-to-area ratio and between mean RI and dry mass are presented in FIG. 3G, where a clear separation of all the three cell types can be observed. The details for computing mean RI, volume, surface area, and dry mass and their distributions are elaborated in Supplementary Materials, Section S8.

2.5 Observing Red Blood Cell Deformation

Figure 4A:
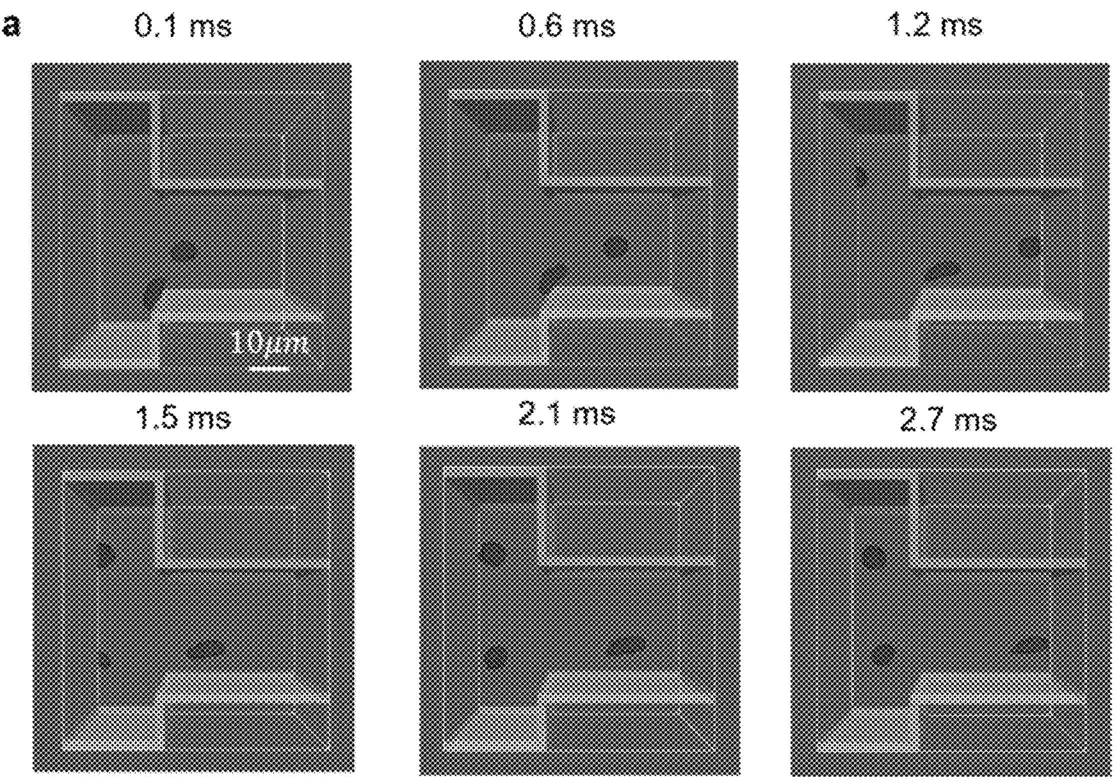
Figure 14A:
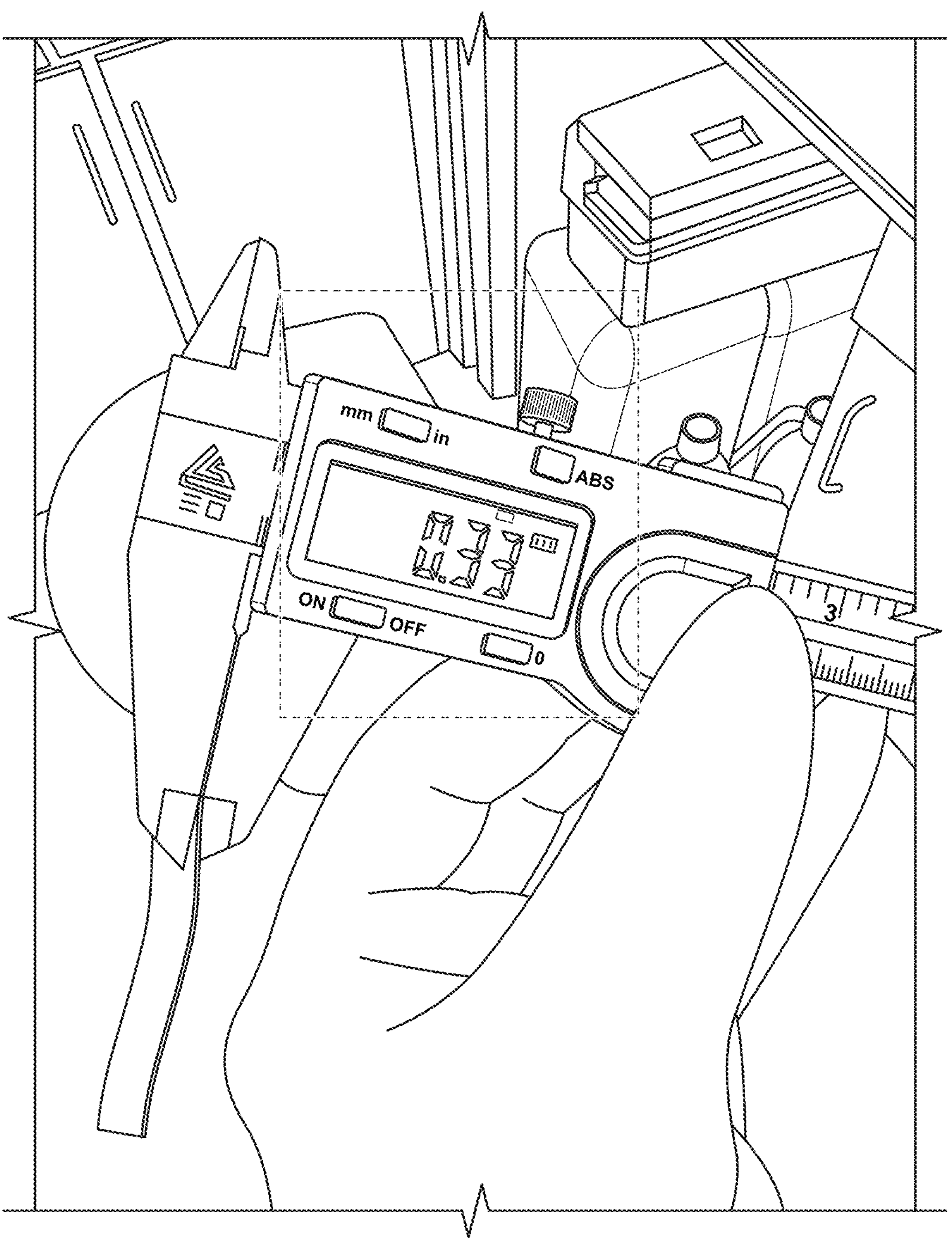
Figure 14B:
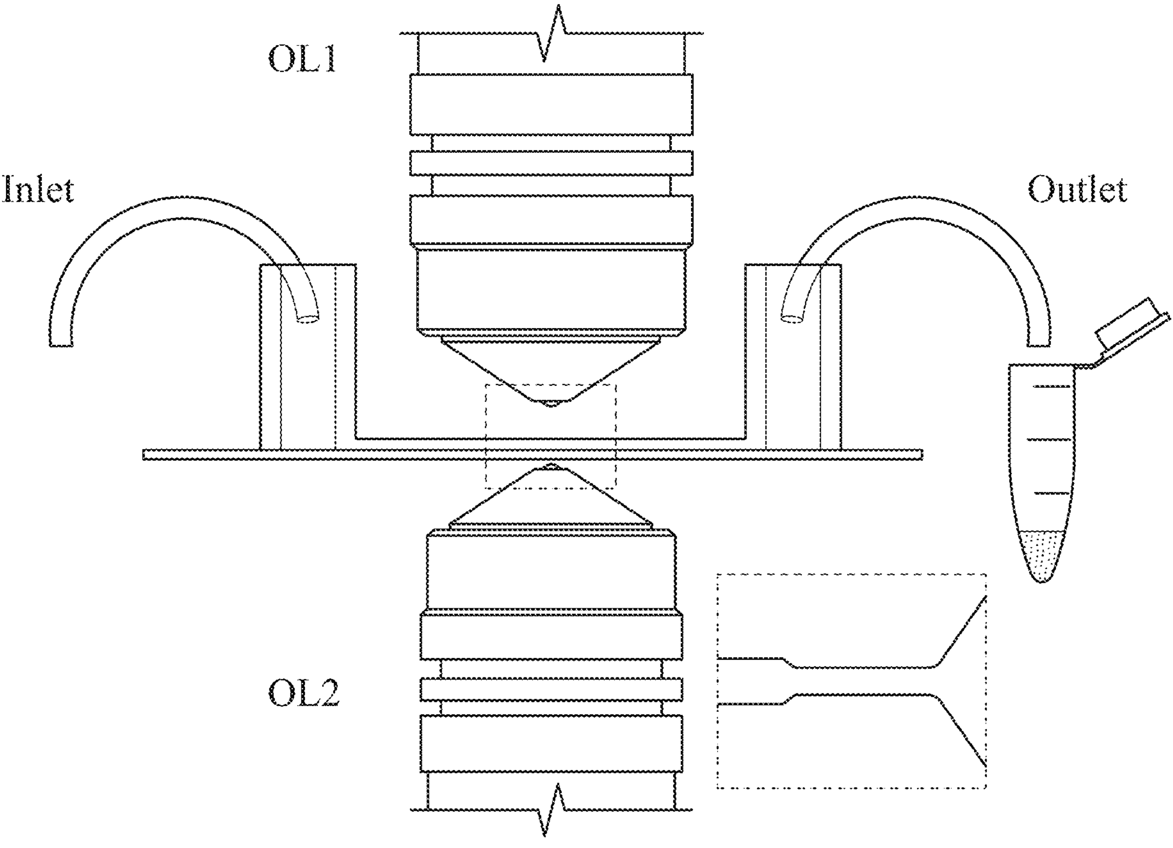
Figure 14C:
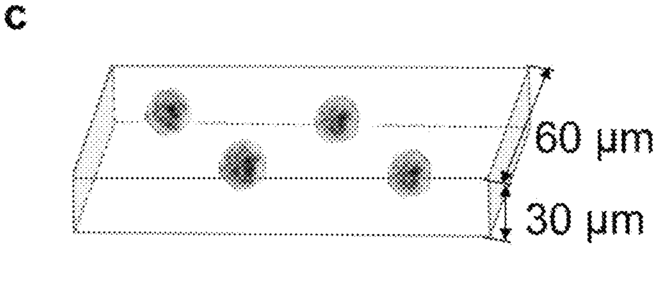
Figure 14D:
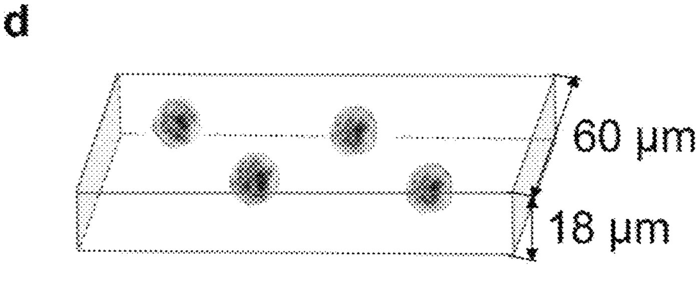
Figure 14E:
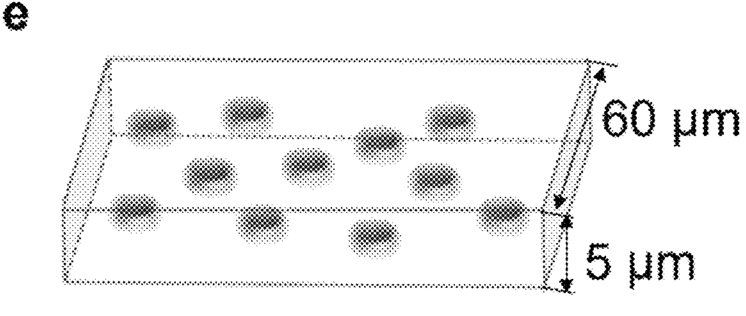
Figure 14F:
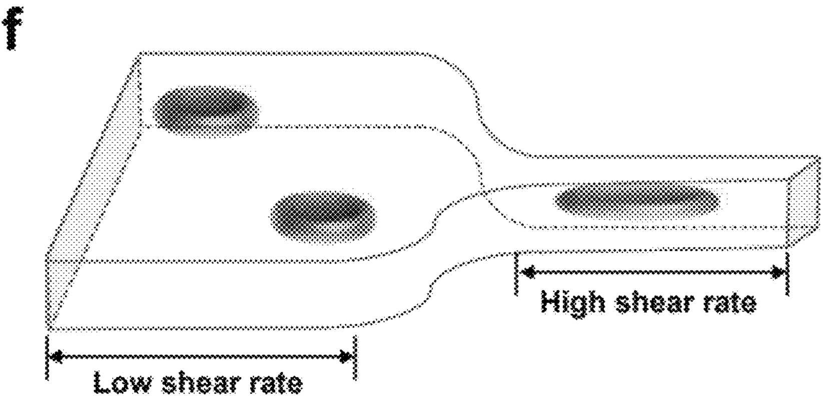

As illustrated in the scheme of shear force-induced RBC deformation in FIG. 14F, the RBCs in the microfluidic channel (see Supplementary Material, Section S10 and S11) can be deformed by increased shear rates when floating from wider space to narrower regions. The flow velocity is 0.33 m/sec, and the 3D image acquisition speed is 10,000 vps. The entire process of RBC deformation is captured as a time-lapse video of 3D RI maps reconstructed by SILACT. Volumetric renderings of selected frames are shown in FIG. 4A. The ML engine used for the results in this section is trained with a dataset of about 500 input-ground truth pairs of human RBCs, approaching PCC of about 0.96 for test samples. The ML engine is also trained with the NIH/3T3 cells and the RBC results are compared with the current results (refer to the details in Supplementary Materials, Section S9). The NIH/3T3 cells trained RBC results are slightly worse with PCC drops to about 0.88, while the extracted morphological parameters remain similar, further supporting the generalization capability of SILACT.

Figure 4B:
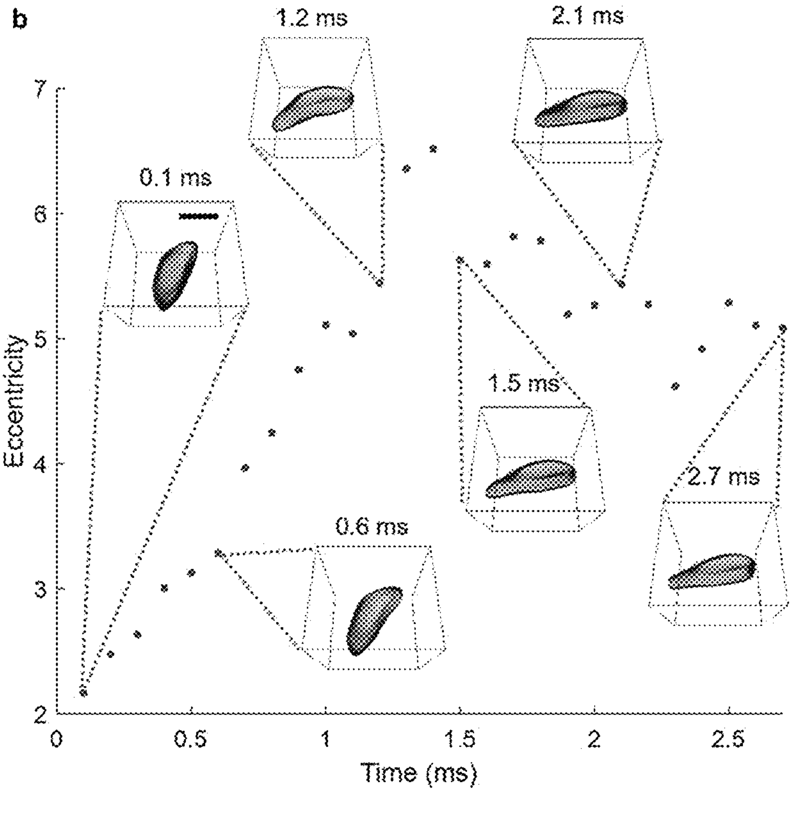

FIG. 4B quantifies the evolution of a selected RBC's eccentricity (formula in Supplementary Materials, Section S8) as it drifts into the region of higher shear rate in the microfluidic channel. As expected, the RBC gets elongated as it flows through the transition region, and it stabilizes after completely entering the narrower section of the channel.

3. Discussion

SILACT's performance is based on a careful system-level coordination of the two key design choices: multiplex illumination with four angles, a fairly small number, to obtain the raw images; and a physics-incorporating ML engine which converts the raw images to Phase Approximants and finally to 3D RI maps. The battery of tests described in the previous sections and in the Supplementary Materials is designed to validate 3D RI map fidelity despite operating the instrument aggressively at thousands of volumes per second. Concerns about ML, in particular, are often well justified when the parameters of an algorithm are determined not from first principles directly but rather from numerical optimization—this is the infamous "black box" problem. Traditional compressed sensing algorithms[49-51] often come under similar criticism. In this case, by incorporating the Phase Approximant as a prior from instrument physics and the Learning-to-Synthesize scheme for spatial frequency rebalancing, the black box concern has been explicitly mitigated. In addition, ML enhances the spatial resolution of the method for better resolving the intracellular structures and more accurately extracting the morphological parameters.

To facilitate more applications in biology laboratories and clinical practice, several straightforward modifications may be readily implemented into SILACT to significantly decrease the system cost and footprint. For example, multiplex illumination using DMDs can be replaced with a fiber coupler with four output ends to reduce the system dimension and cost. The system cost can be further reduced by replacing the high-speed camera with a cost-effective USB camera, while high-speed 3D imaging at >100 vps can be realized to still meet many biomedical imaging requirements, thanks to the single-frame 3D imaging capability of SILACT. The algorithm is also amenable to improvements, such as implementing transfer learning[52] to further broaden the diversity of cells that can be reliably reconstructed. Furthermore, as the 3D RI maps reconstructed by SILACT contain rich information in both morphology and biochemical content of the cells, ML-based image classification can facilitate cell classification in blood testing (for example, circulating tumor cell detection and leukocyte sub-type differential counting), drug screening.

1. Mathematical Formulation for Phase Approximant Retrieval

The irradiance of the interference between the sample field, resulting from illumination with N illumination angles, and the reference field can be described as:

$$I(r) = \left|\sum_{m=1}^{N} E_S^{(m)}(r) + E_R\right|^2 = |E_R|^2 + \sum_{m=1}^{N}\left|E_S^{(m)}(r)\right|^2 + \sum_{m=1}^{N}\left\langle E_S^{(m)}(r), E_R\right\rangle + \sum_{i,j(i\neq j)}\left\langle E_S^{(i)}(r), E_S^{(j)}(r)\right\rangle, \tag{1}$$

where $$E_s^{(m)}(r)$$

is the sample complex field due to the $m^{th}$ illumination angle, $E_R$ is the reference field that is a plane wave, and <•> denotes the spatial correlation function that describes the interference between fields. The $3^{rd}$ and $4^{th}$ terms in Eqn. 1 denote the interference between the scattered beams and the reference beam, which will show up in the $+1^{st}$ and $-1^{st}$ orders in the Fourier domain. Both the $+1^{st}$ and the $-1^{st}$ orders contain the same sample structural information. Next, the $+1^{st}$ order (that is, the $3^{rd}$ term in Eqn. (1)) is expanded as:

$$\sum_{m=1}^{N}\left\langle E_S^{(m)}(r), E_R\right\rangle = \sum_{m=1}^{N}\left|E_S^{(m)}(r)\right||E_R|\cos\left(\left(k_S^{(m)} + k_R\right)\cdot r + \Delta\phi^{(m)}(r)\right), \tag{2}$$

where $$k_s^{(m)}$$

is the wave-vector of the scattered field, corresponding to the $m^{th}$ illumination angle, while $k_R$ is the wave-vector of the reference beam. Applying a 2D spatial Fourier transform over the $+1^{st}$ order as described in Eqn. (2), Eqn. (3) below is obtained:

$$\tilde{I}_{+1}(k) = |E_R|\sum_{m=1}^{N}\Im\left[\left|E_S^{(m)}(r)\right|\exp\left(i\Delta\phi^{(m)}(r)\right)\right] * \delta\left(k - k_S^{(m)} - k_R\right), \tag{3}$$

where $\tilde{I}_{+1}(k)$ denotes the $+1^{st}$ order spectrum, $\Im[\bullet]$ denotes the Fourier transform operator, and * denotes the 2D convolution in space. For the $m^{th}$ illumination angle, the original sample spectrum is shifted by $$k_s^{(m)} + k_R.$$

Figure 5A:
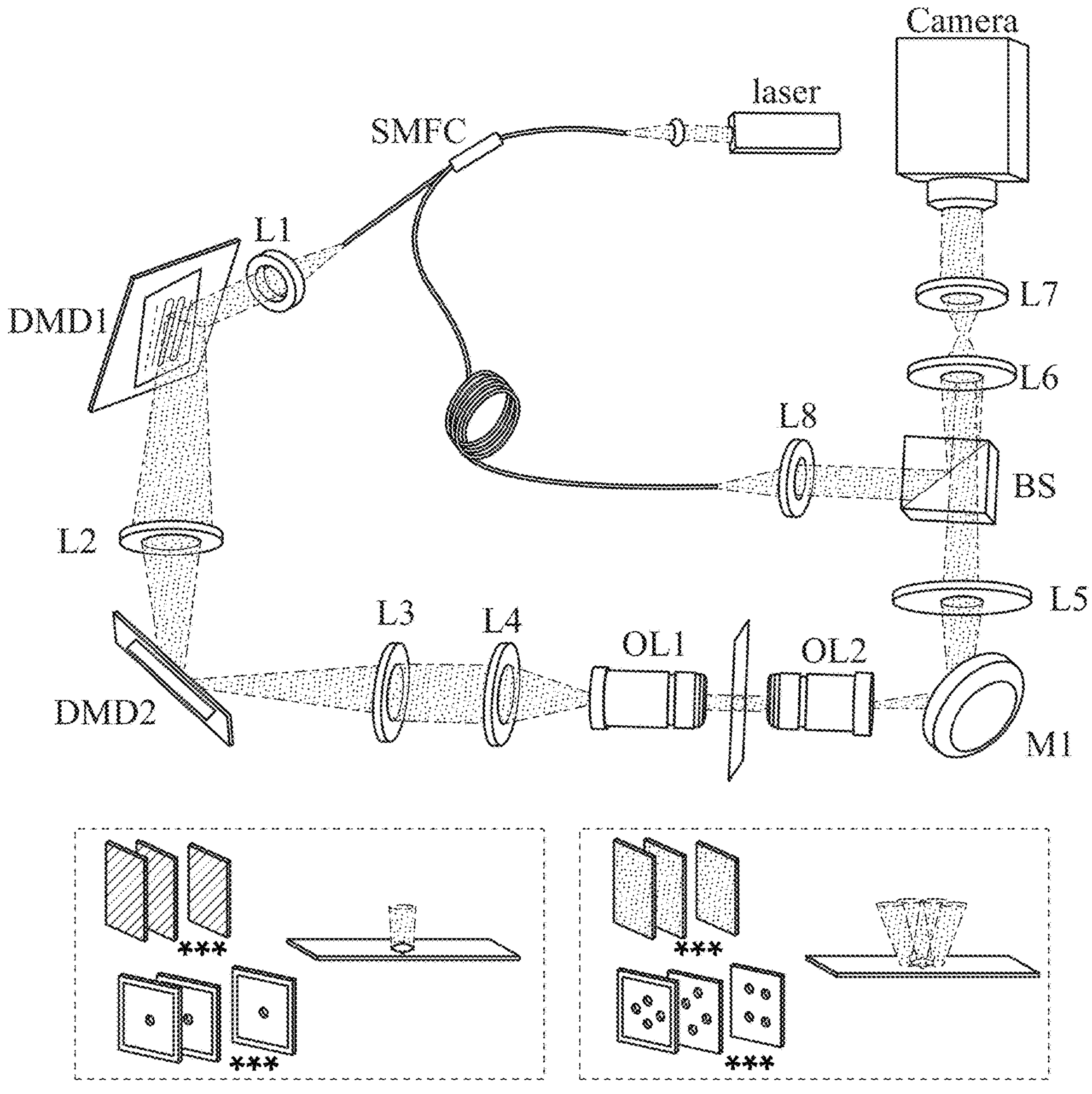
Figure 5B:
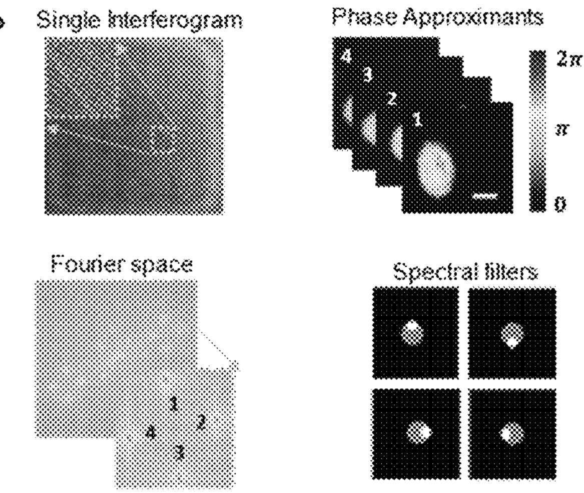

Therefore, four bright regions in the $+1^{st}$ order are observed as shown in FIG. 5B. In experiments, the numerical aperture (NA) of the objective lens 2 (OL2) limits the bandwidth of the spectrum that can be used. Therefore, a pupil function is added to the $+1^{st}$ order spectrum $\tilde{I}_{+1}(k)$ as:

$$\tilde{I}'_{+1}(k) = P(k - k_R)\tilde{I}_{+1}(k), \tag{4}$$

where $P(k-k_R)$ is the shifted pupil function with $P(k)$ defined as the following: $P(k)=1$ when $|k-k_R|\leq k_C$; and $P(k)=0$, when $|k-k_R|>k_C$, $$k_c = \frac{2\pi}{\lambda}NA$$

is the cut-off spatial frequency of the pupil function, A is the wavelength, and NA=1.25 is the numerical aperture of OL2. In the Fourier domain, there are N sample spectrums, corresponding to N illumination angles, which are overlapped and cannot be easily separated through a linear fitting. In the experiments with N=4, it is noted that the sample spectrum of each illumination angle is mainly concentrated in the low-frequency band. Therefore, there is a possibility to separate each sample spectrum without suffering severe aliasing. For the $m^{th}$ illumination angle, following a spectral filtering process, its corresponding estimated sample field $\hat{E}_s^{(m)}(r)$ can be described as:

$$\hat{E}_S^{(m)}(r) = \left|\hat{E}_S^{(m)}(r)\right|\exp\left(i\left(\Delta\hat{\phi}^{(m)}(r) + \left(k_R + k_S^{(m)}\right)\cdot r\right)\right) = \mathfrak{I}^{-1}\left[p^{(m)}\left(k - k_R - k_S^{(m)}\right)\tilde{I}'_{+1}(k)\right], \quad (5)$$

where $\mathfrak{I}^{-1}$ [•] denotes the inverse Fourier transform, and $p^{(m)}(k)$ is the spectral filter that selects the information for the $m^{th}$ illumination angle. $p^{(m)}(k)=1$ is defined, when $$\left|k - k_R - k_S^{(m)}\right| < k_f,$$

where $k_f$ is the cut-off spatial frequency; and $p^{(m)}(k)=0$, when $$\left|k - k_R - k_S^{(m)}\right| \geq k_f.$$

The determination of $k_f$ value presents a trade-off: a larger $k_f$ value can retain the high spatial frequencies from the sample at the cost of introducing more aliasing; whereas, a smaller $k_f$ can reduce aliasing by sacrificing high spatial frequencies from the sample. With an additional measurement of the background (the sample-free field of view, whose Fourier transform at the $+1^{st}$ order is represented as $\tilde{I}_{BG}(k)$), the phase map corresponding to the $m^{th}$ illumination angle is retrieved as:

$$\Delta\hat{\phi}^{(m)}(r) = \angle\left[\mathfrak{I}^{-1}\left[p^{(m)}\left(k - k_R - k_S^{(m)}\right)\tilde{I}_m(k)\right]\right] - \angle\left[\mathfrak{I}^{-1}\left[p^{(m)}\left(k - k_R - k_S^{(m)}\right)\tilde{I}_{BG}(k)\right]\right], \quad (6)$$

where ∠ denotes the phase of a complex field. The phase maps retrieved from the interferogram with multiplex illumination are termed 'Phase Approximants'. In the angle-multiplex interferometric microscope as shown in FIG. 5A, four illumination angles are selected and are uniformly distributed along the outer circle of the back focal plane (BFP) of objective lens 1 (OL1) with the same elevation angle of around 59.27° as illustrated by the red spots in FIG. 7A. It is determined that these four angles are sufficient for reconstructing a high-quality 3D RI map when using the DNN-based reconstruction model (refer to Section 2.2 in the main text). To balance between preserving high-frequency components and minimizing spatial frequency aliasing, the spectral filter size $k_f$ need to be optimized. Here $k_c$ is used as the unit to characterize the size of the spectral filter Mean Absolute Error (MAE) and Pearson Correlation Coefficient (PCC) to quantify the accuracy of the Phase Approximants. PCC and MAE are defined as:

$$PCC(\phi, \hat{\phi}) = \frac{\sum_i(\phi_i - \overline{\phi})(\hat{\phi}_i - \overline{\hat{\phi}})}{\sqrt{\sum_i(\phi_i - \overline{\phi})^2\sum_i(\hat{\phi}_i - \overline{\hat{\phi}})^2}}, \quad (7)$$

-continued and $$MAE(\phi, \hat{\phi}) = \frac{1}{N}\sum_i\left|\phi_i - \hat{\phi}_i\right|, \quad (8)$$

where $\phi$ is the true phase map retrieved with the angle-scanning scheme; $\hat{\phi}$ is the Phase Approximant extracted from the single-frame multiplex interferogram; i denotes the index of each pixel and N is the total number of pixels. In FIGS. 6B-6C, it is shown that the Mean Absolute Error (MAE) and Pearson Correlation Coefficient (PCC) values when $k_f$ is 0.3-0.8 $k_c$. It is noted that a small spectral filter size of 0.3 $k_c$ or less incurs a large loss of high-frequency information that causes a great loss of phase retrieval accuracy. On the other hand, it is observed that a large filter size of 0.8 $k_c$ deteriorates the accuracy of the Phase Approximants which is expected due to the aliasing problem, despite losing less high-frequency information. Therefore, the spectral filter size is selected to be 0.5 $k_c$, which is expected to well balance between preserving high-frequencies and inhibiting aliasing.

2. 3D RI Map Reconstruction Models

The physical principles and mathematical framework are provided for reconstructing 3D RI maps with the angle scanning interferometric microscope. It is worth noting that when using data-driven methods to improve the imaging performance in SILACT, a reliable ground truth 3D RI map reconstruction model, based on accurate physical modelling, is required to construct the training dataset. Firstly, the forward model is formulated for reconstructing the 3D RI map from the measured complex fields corresponding to different illumination as following:

$$g_m = S_m(x), \quad (9)$$

where $g_m$ is the measured complex field of the $m^{th}$ illumination angle, x is the 3D RI map that needs to be solved, and S is the operator that maps the 3D RI map to the measured complex field. S could be formulated with different physical models. After that, the inverse problem of Eqn. (9) can be described as following:

$$\hat{x} = \operatorname{argmin}_x \sum_{m=1}^{N} \|S_m(x) - g_m\|_2^2, \quad (10)$$

where $\hat{x}$ is the estimated 3D RI map when there are N illumination angles. As the forward model S is nonlinear, directly solving Eqn. (10) is very difficult. One of the solutions is to linearize Eqn. (10) with a proper approximation. For example, when imaging cells, one can apply the first-order Rytov approximation[1] to simplify Eqn. (9) as following:

$$S_m(x) = A_m x = \left(\frac{k^2}{4\pi}\right)\int_V\left(\frac{x^2(r')}{n_m^2} - 1\right)e^{-i(k-k_m)r'}\,dr', \quad (11)$$

where $A_m$ represents the forward model derived from the Rytov approximation for the $m^{th}$ illumination angle, r' is a spatial coordinate of a point in the observed object, $k=(k_x, k_y)$ is a wave-vector in the frequency domain, $$k_m = ks_m = k\left(s_x^{(m)}, s_y^{(m)}, s_z^{(m)}\right)$$

is the wave-vector of the $m^{th}$ illumination angle. $A_m$ maps the 3D RI map into the 3D Fourier space. Meanwhile, the left-hand side of Eqn. (9) that is the measurement of ODT can be rewritten as:

$$g_m = \frac{ks_z^{(m)}}{2\pi i}\int\int_{-\infty}^{\infty} U_0^{(m)}(r)\ln\frac{U(r)}{U_0^{(m)}(r)}e^{-i\left(ks_x^{(m)}x+ks_y^{(m)}y\right)}dxdy, \tag{12}$$

where $$U_0^{(m)}(r)$$

is the $m^{th}$ illumination field, $$U(r) = U_0^{(m)}(r) + U_s(r), \text{ and } U_s(r)$$

is the sample scattered field. Now the forward model is linearized. However, the inverse problem is still difficult to solve since it may amplify the noise and the missing cone problem (missing axial frequency support at low lateral frequencies of the Fourier space) still exists. To mitigate those problems, a regularization term can be added to Eqn. (10), also called regularized ODT[2], then the inverse problem becomes:

$$\hat{x} = \text{argmin}_x \sum\nolimits_{m=1}^{N} \|A_m x - g_m\|_2^2 + \alpha R(x), \tag{13}$$

where $\alpha$ is the regularization coefficient, and R(x) is the regularization term. The aforementioned forward and inverse models are the basic principle of optical diffraction tomography with Rytov approximation. To simplify our description, this method is termed "Rytov ODT": the direct inverse of Eqn. (9) is what is termed "Rytov ODT without regularization"; and the method that using Eqn. (13) to solve the 3D RI maps is termed "Rytov ODT with regularization".

It is noted that the presented linear model may not be accurate as it assumes single scattering in the biological specimen. For more accurate 3D RI reconstructions, a nonlinear forward model is needed to account for multiple scattering. U. S. Kamilov et al. proposed a nonlinear forward model based on the beam propagation method (BPM), which demonstrated a more accurate reconstruction of the 3D RI maps of cells[3,4]. In the BPM model, the 3D object is sliced along the z-direction into k=1, 2, . . . , K layers, which assembles the structures of neural networks. The electric field between layers is propagated via linear mapping:

$$S_k(x) = \text{diag}(p_k(x_k))HS_{k-1}(x), \tag{14}$$

where $S_k(x)$ is the optical field of the $k^{th}$ layer, and diag(•) is the operator to turn a vector into a diagonal matrix. H is a diffraction operator which is simplified by Fresnel propagation, while $p_k(x_k)=\exp(ikx_k\delta z)$ describes the refraction taking place in the k-th layer, and $\delta z$ denotes the interval between layers. Then, the inverse problem can be formulated as:

$$\hat{x} = \text{argmin}_x \sum\nolimits_{m=1}^{N} \left\|S_K^{(m)}(x) - g_m\right\|_2^2. \tag{15}$$

The strategy to solve this problem is based on gradient descent. Here $g_m$ is different from what we used in Eqn. (13), which is the measured electric field in the spatial domain ($g_m(r')=E_m(r')\exp(i\phi_m(r'))$. Here $E_m(r')$ is the spatial distribution of amplitude of the measured optical field; $\phi_m(r')$ is the measured phase map. Firstly, the gradient of the loss function is calculated by iterating between different layers, then the RI values of different layers are updated by applying total variation (TV) regularization. The optimization process in this method is similar to training a neural network. Therefore, it is also termed "Learning Tomography based on Beam Propagation Method (LT-BPM)"[4].

3. Assessment of LT-BPM Reconstructed RI Maps as Ground Truth

Figure 7A:
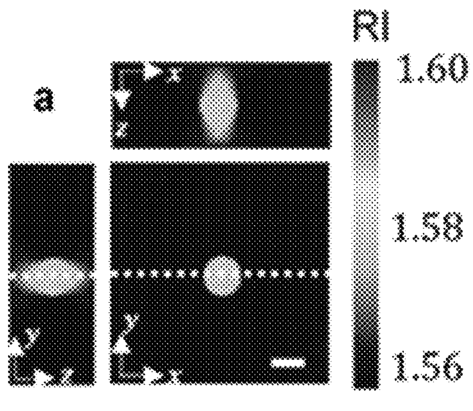
FIGS. 7A-G show results of evaluation of micro-beads' RI maps reconstructed with different approaches, demonstrating 3D RI maps of a polystyrene bead reconstructed with Rytov ODT approach without regularization in FIG. 7A, Rytov ODT approach with TV regularization in FIG. 7B, and LT-BPM in FIG. 7C, respectively, wherein the plots of the 3D RI maps along x-axis in FIG. 7D and z-axis in FIG. 7E, respectively, of different reconstruction methods and the ground truth RI map, wherein the quantitative evaluations of FIG. 7F for MAE, and FIG. 7G for RMSE of the ground RI maps, and the ones obtained with different reconstruction methods' performance are shown, wherein the scale bar in FIG. 7A denotes 10 μm, while the white dashed lines show the positions where the curves in FIG. 7D and FIG. 7E are plotted, according to an embodiment of the subject invention.
Figure 7B:
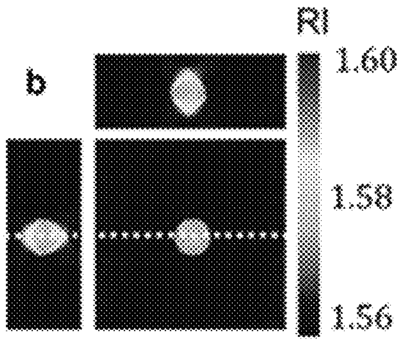
Figure 7C:
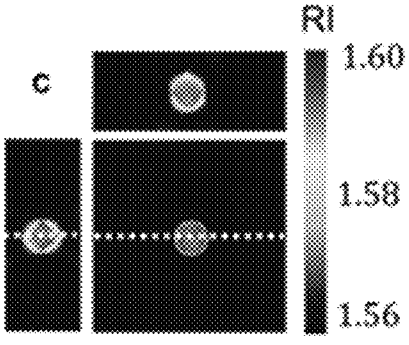

As a 3D RI reconstruction algorithm[3,4], LT-BPM can retrieve the 3D RI maps with good accuracy. Here the 3D RI map of a polystyrene bead (RI ~1.595, diameter ~10 μm) with the Rytov ODT without regularization, Rytov ODT with regularization, and LT-BPM is reconstructed, respectively. The microbeads are immersed in the medium of oil with the RI of 1.56 and sandwiched with two No. 1 coverslips. The 3D RI maps are reconstructed based on the interferograms acquired from 49 illumination angles by a home-built optical diffraction tomography system. It is noted that the LT-BPM method is initialized with the Rytov ODT reconstruction results to accelerate the convergence. The comparison of reconstruction results is shown in FIGS. 7A-7C, respectively. In FIG. 7C, a new metric is used to quantify the difference between the ground truth and the reconstructed results, which is Root Mean Square Error (RMSE). The formula for calculating RMSE is shown as below:

$$RMSE(n, \hat{n}) = \frac{1}{N}\sqrt{\sum\nolimits_i |n_i - \hat{n}_i|^2}, \tag{16}$$

where n and $\hat{n}$ are the ground truth and reconstructed 3D refractive index maps, respectively. It is noted that in regularized Rytov ODT and LT-BPM, the value of regularization coefficient $\alpha$ can be adjusted to balance between the data-fidelity term and the regularization term to denoise and to mitigate the missing-cone issues. Generally, this parameter tuning process is empirical. To fairly compare the 3D RI maps, the regularization coefficient $\alpha$ is chosen to be $5\times10^{-5}$, and each algorithm (Rytov with regularization and LT-BPM) iterates 50 times.

Figures 7D, 7E, 7F, 7G:
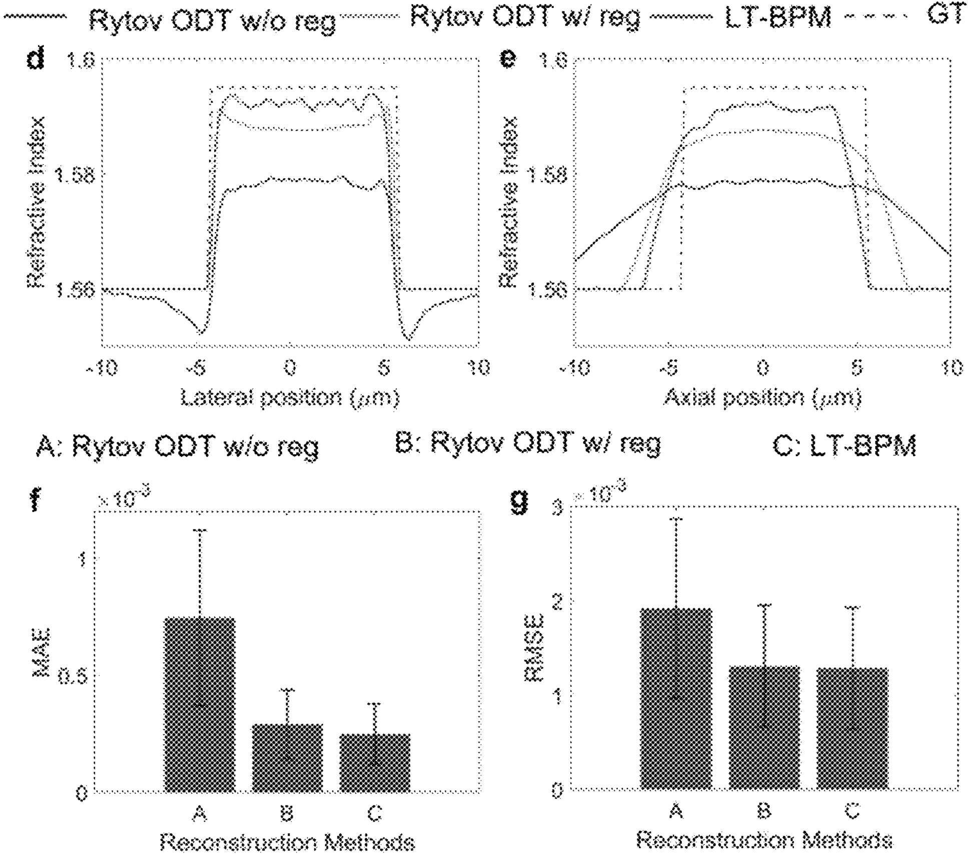

In FIGS. 7D-7E, the lateral and axial cross-sections of the beads' RI profiles reconstructed by the three approaches are compared. It is seen that Rytov ODT method without any regularization, despite its fast speed, incur two major artifacts. First, some of the region in the reconstruction has RI values lower than 1.56, which is impossible in real cases.

Second, the RI reconstructions incur visible elongation along the axial direction, indicating the missing cone problem and this elongation causes the reconstructed RI values smaller than they should be. It is found that the non-negativity constraint in Rytov ODT or LT-BPM is sufficient to resolve the first type of artifacts. However, LT-BPM is better than the regularized ODT at mitigating the axial elongation artifact, as indicated in FIG. 7E. Since the Rytov ODT with regularization and LT-BPM share the same regularization coefficient, it suggests that the improved performance resulted from the introduction of the nonlinear scattering model (beam propagation method). To further justify the claim, 100 polystyrene beads are imaged and the MAE and RMSE between the ground truth and the RI maps reconstructed by the proposed three methods are calculated and the results are demonstrated in FIGS. 7F-7G, where it is seen that for both MAE and RMSE, LT-BPM outperforms the other methods.

Figures 8A, 8B, 8C, 8D:
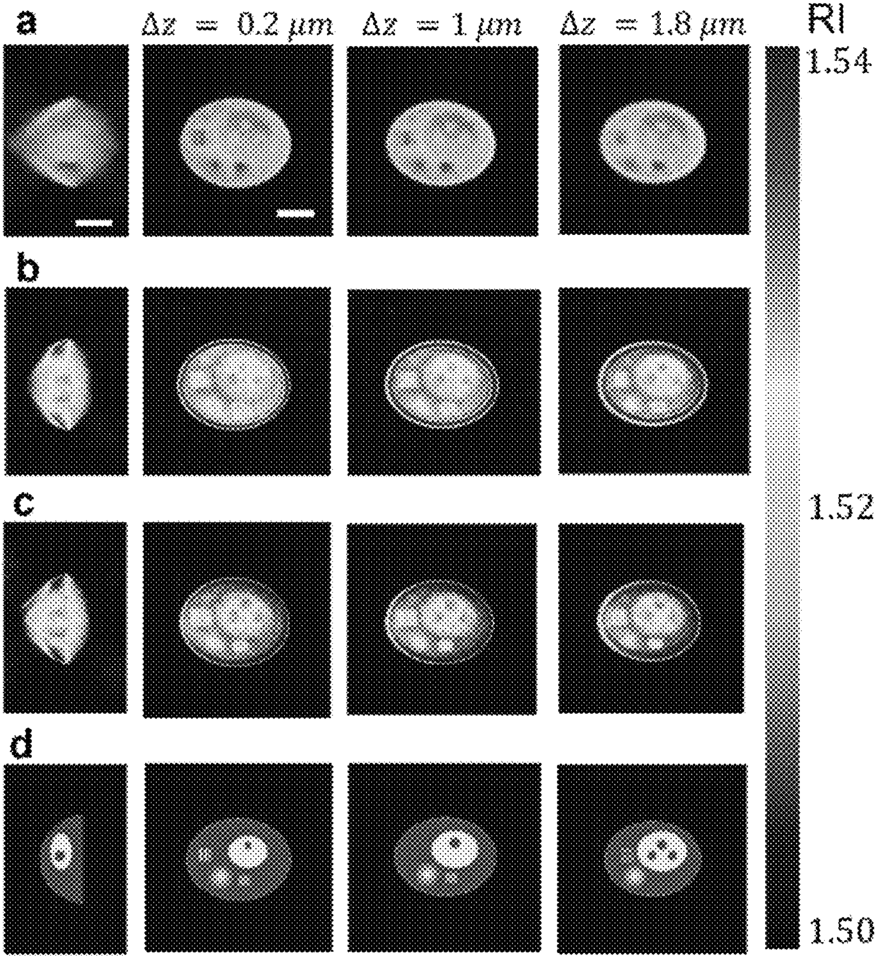
Figure 8E:
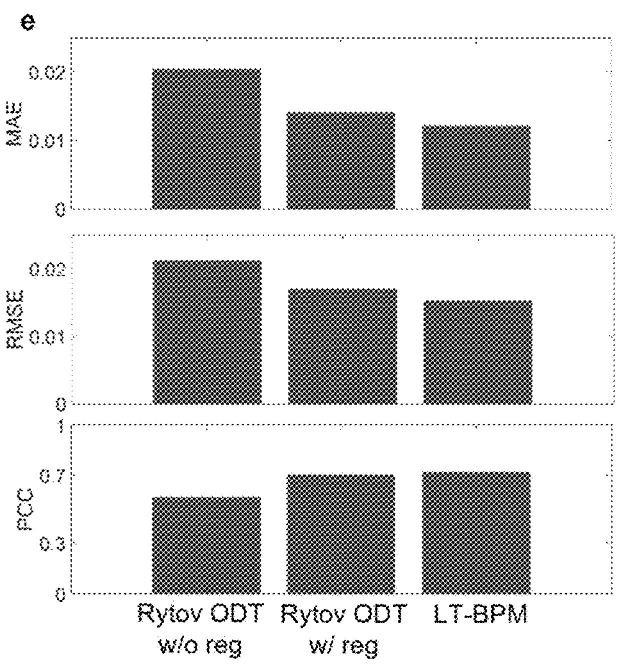

Even if the accuracy of the ground truth RI maps reconstructed with LT-BPM has been validated with polystyrene beads, there is still a need for further validations of its reliability on cells that usually have complex structures. Here an artificial cell phantom sample fabricated with 3D printing[5] is used to evaluate the performances of different ODT reconstruction methods (Rytov ODT without regularization, Rytov ODT with regularization, and LT-BPM as elaborated in previous sections). Immersion oil with an RI of 1.50, the maximum RI difference between the phantom structures and the immersion oil is within 0.03 are used, as shown in the ground truth RI map of the cell phantom in FIG. 8D. It is demonstrated that the reconstructed 3D RI maps with those aforementioned methods in FIGS. 8A-8C. The left column shows the y-z cross-sections of the 3D RI maps, while the right three columns demonstrate their x-y cross-sections of different layers. Compared with the ground truth, it is seen that LT-BPM is capable of recovering more details and retrieving closer absolute RI values than the other two methods. The result is also validated with the quantitative evaluations shown in FIG. 8E, where the MAE, RMSE, and PCC between the ODT reconstructed RI maps and the ground truth are calculated. Thus, it is determined that LT-BPM has superior performance both visually and quantitatively than Rytov ODT approaches with or without regularization.

4. RI Reconstruction Schemes

In Section 2.2, the reconstructions from three different schemes, namely, LT-BPM, MDODT, and SILACT are compared. Here, each scheme is introduced in more depth. The number of image acquisitions is denoted as K in this section.

(i) LT-BPM reconstructions based on K image acquisitions. In this scheme, interferograms based on K illumination angles are individually captured. The LT-BPM algorithm takes in these K phase maps, each extracted from the corresponding single-angle interferogram, and produces the final reconstructions iteratively. Since the phase estimation from the single angle interferograms is highly reliable, phase maps are referred to as true phase maps.

(ii) Multi-frame deep-learning ODT (MDODT) with K illumination angles. The data acquisition process is identical to that in the scheme (i), but a machine learning engine is trained to map K true phase maps to 3D refractive index (RI) maps. It costs the same acquisition time as that of LT-BPM for the same K. Though the training may take a few hours, the inference time is negligible once the network has been trained. It is noted that here, for K=1, it refers to the scenario where only the normal incident illumination is used.

(iii) Single-frame deep-learning ODT (also known as the reconstruction model in SILACT), where the input to the pipeline is the single-shot angle-multiplexed interferogram based on 4 uniformly spaced illumination angles (but only 1 acquisition). The machine learning engine is trained to produce 3D RI maps from the Phase Approximants of the four individual phase maps.

5. Architecture of U-Net with Residual Blocks and Training Specifics

Figure 9A:
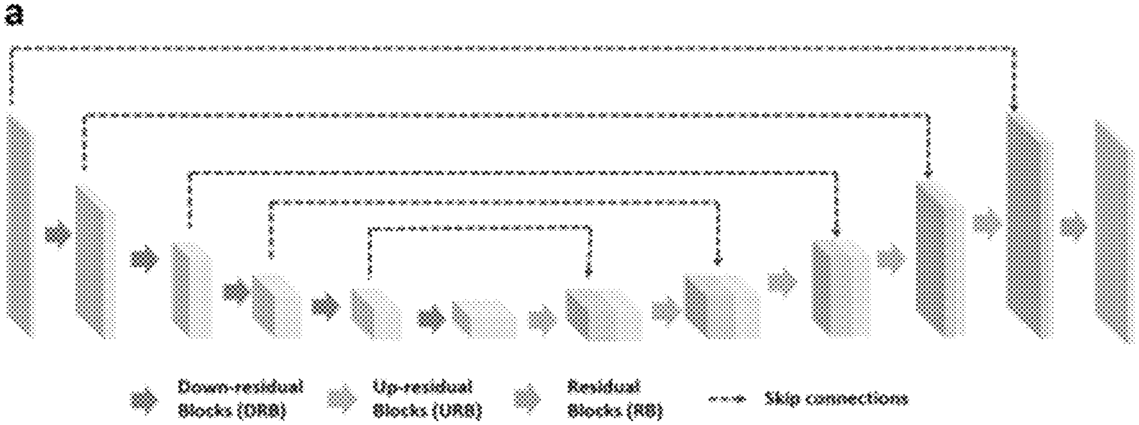
Figure 9B:
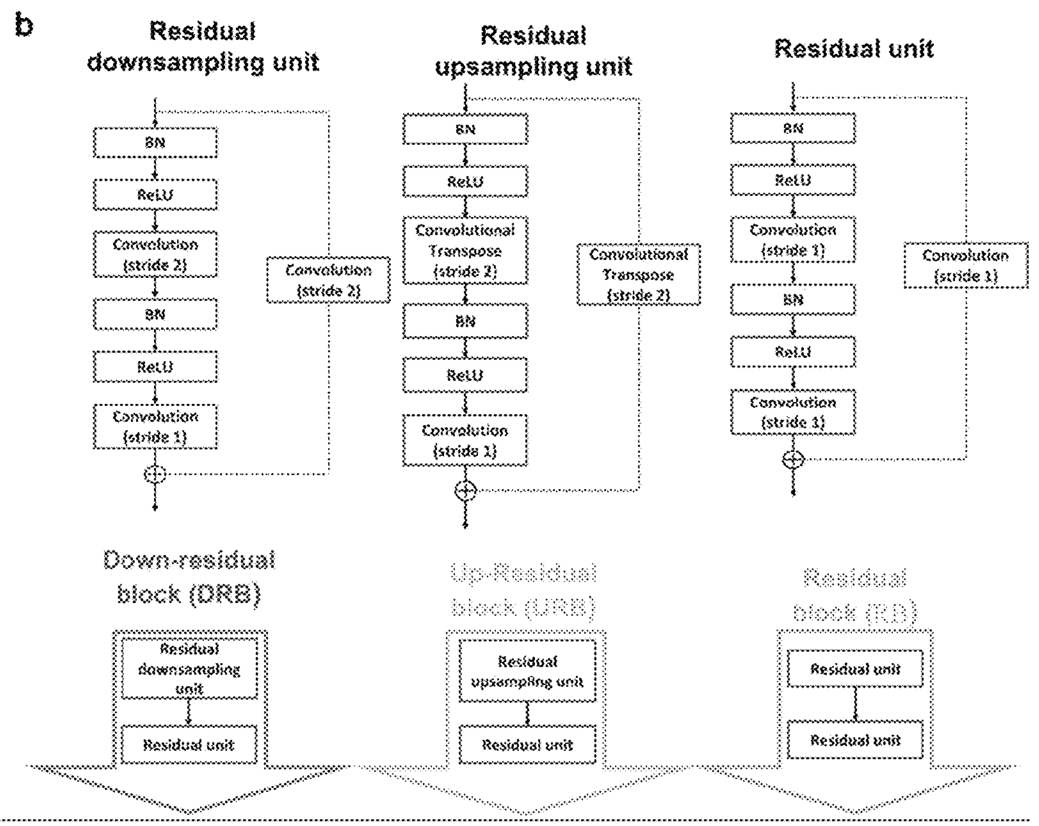

As mentioned in Methods, the U-Net with residual blocks is used as the fundamental architecture for DNN-L, DNN-H, and DNN-S, illustrated earlier in FIG. 5C. The architecture of the residual U-Net architecture is shown in FIG. 9A, where it is seen that canonical U-Net comprises multiple down residual blocks (DRB), gradually extracting features from the input, followed by several up residual blocks (URB) to scale the feature maps up to the correct size. Skip connections are proven beneficial for the spatial resolution of the reconstructions. In the meanwhile, residual blocks are used in the U-Net to stabilize training and inhibit gradient exploding/vanishing when the network depth is large[6]. The detailed structures of DRB, RB, and URB in our U-Net with residual blocks architecture are shown in FIG. 9B.

The major ML engine used for the validation and demonstration of the 3D flow imaging cytometer is trained with a dataset only contains about 900 input-ground truth pairs of NIH/3T3 cells. Since the RBCs have distinct structures from eukaryotic cells, in the section for observing the deformation of RBCs, the RBCs in the microfluidic channels are also tested with a ML engine trained on about 500 input-ground truth pairs of RBCs. In Section 2 above, the sizes of the testing datasets for NIH/3T3 cell, HEK293 cells, HeLa cells, and COS-7 cells are 39, 69, 85, and 68, separately. The training is conducted on a Nvidia Tesla K80 GPU using the open-source machine learning Platform TensorFlow & Pytorch. In each training of DNN-L, DNN-H, and DNN-S, 500 epochs are trained with a batch size of 2 and a learning rate of 0.01. Adaptive Moment Estimation (Adam) optimizer is used, and in each epoch, 5% of the data is used for validation. The training and validation datasets are not shuffled between epochs during training. Namely, the validation dataset is not 'seen' by the DNN model so that the generalization ability from the training curves can be validated.

Figure 5C:
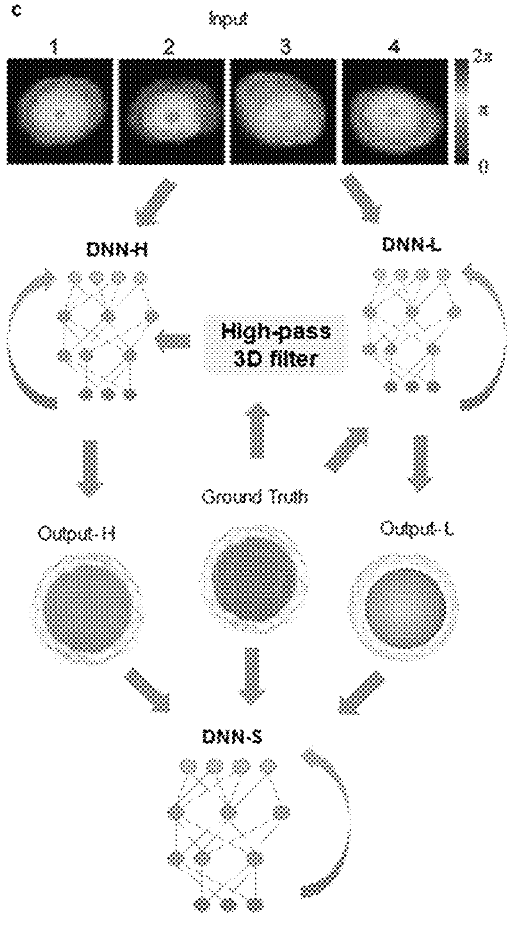

The input of the DNN models has a size of 256×256×4 (4 Phase Approximants estimated from each interferogram), while the size of the ground truth RI maps is 256×256×100. The original size of each interferogram is 1024×1024, however, the spectral filter used for decoupling the 4 illumination angles crops out the high-frequency information, as shown in FIGS. 5A-5C, which does not have a significant influence since the phase maps do not contain too much detailed information. Each estimated Phase Approximants is down sampled to a size of 256×256 to accelerate the computation of ground truth RI maps and the training of ML engines, without too much loss of the spatial resolution. The RI maps reconstructed by LT-BPM actually have a size of 256×256×256. However, only the central 100 layers are kept for training the DNN models, since most cells have relatively flat structures, and the rest layers have little information of the cell's structure. Getting rid of these layers will boost the training speed and inhibit the perturbations coming from the noise that is not related to the cells' structures. The reconstruction time for each RI map using LT-BPM is ~20 mins, while the average training time for DNN-L, DNN-H, and DNN-S is 6-7 hours when training on the dataset of ~900 NIH/3T3 cells. The inference time for the trained DNN model is 0.68 s, while the computational time for Phase Approximants is 1.5 sec, and the time used for linear fitting is 0.03 sec. The comparison of different ODT methods' computation time is shown in Table S1, where it is seen that SILACT outperforms other ODT methods according to computation time. The phase retrieval algorithm is universal which searches all the orders in the Fourier domain and performs linear filtering and shifting after all the orders are found. This algorithm can be accommodated to different optical system settings while taking more time. Besides, the DNN inference time could also be improved if we use the computer with better-performed GPUs.

$$m = \frac{\overline{\chi}V}{2n_m\alpha}, \tag{18}$$

where V is the calculated volume of the cell; $n_m$ is the refractive index of the medium, which is 1.337 here since we used the PBS to culture the cells; a is the refractive index increment, which equals 0.2 g·mL$^{-1}$; $\overline{\chi}$ is the mean scattering potential in the cell region, and the scattering potential $\chi$ at position r can be calculated as:

$$\chi(r) = n_c^2(r) - n_m^2, \tag{19}$$

where $n_c(r)$ is the refractive index in the cell at position r.

| | Acquisition time | Phase retrieval | 3D RI reconstruction | Linear fitting | Total computation time |
|---|---|---|---|---|---|
| Rytov ODT | 3.90 msec | 18.93 sec | 19.98 sec | N/A | 38.91 sec |
| Rytov ODT + Regularization | 3.90 msec | 18.93 sec | ~7.8 min | N/A | ~8.1 min |
| LT-BPM | 3.90 msec | 18.93 sec | ~20 min | N/A | ~20 min |
| SILACT | 0.08 msec | 1.50 sec | 0.68 sec | 0.03 sec | 2.21 sec |

6. Additional Reconstructions with SILACT

Figure 6A:
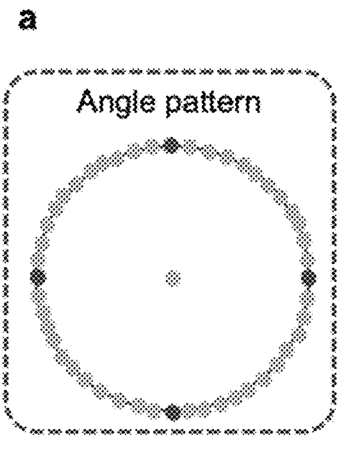
Figure 6B:
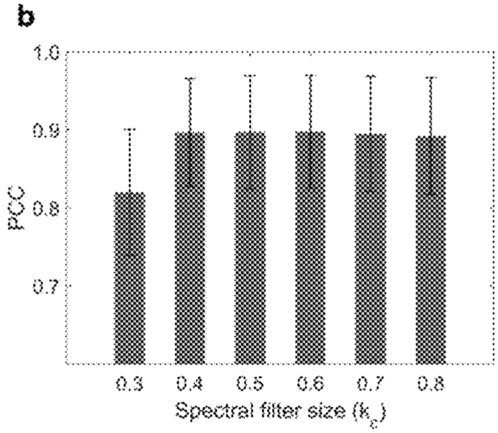
Figure 6C:
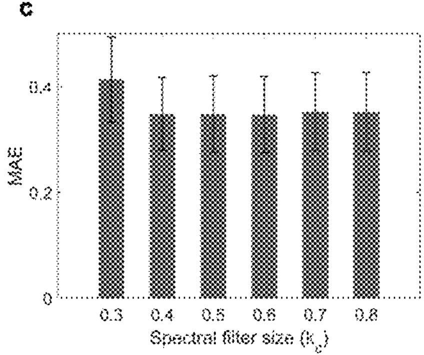
Figure 10A:
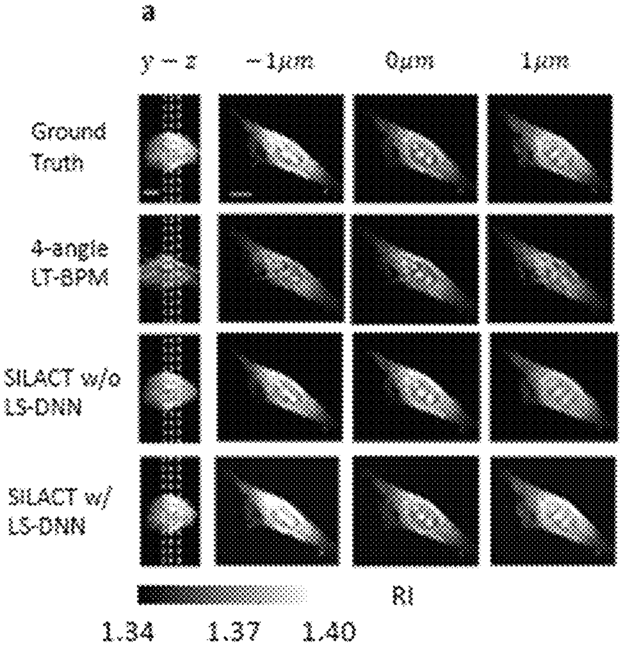
Figure 10B:
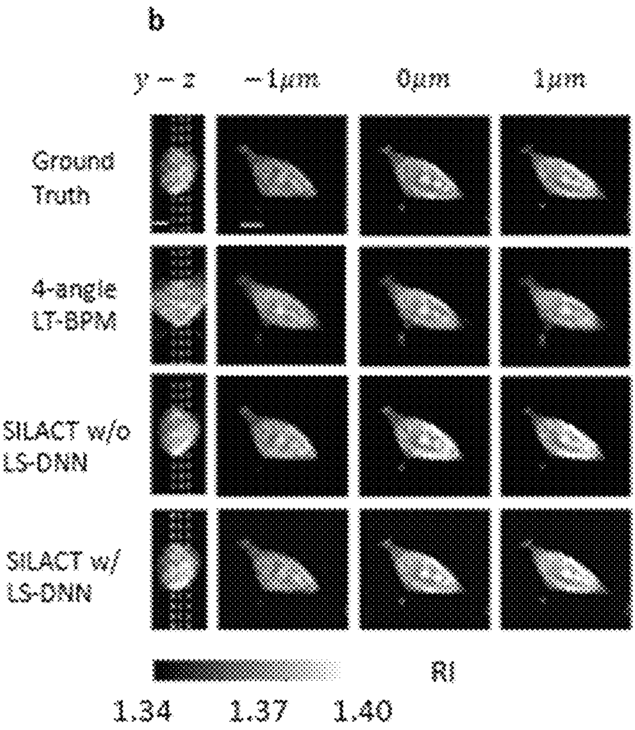
Figure 10C:
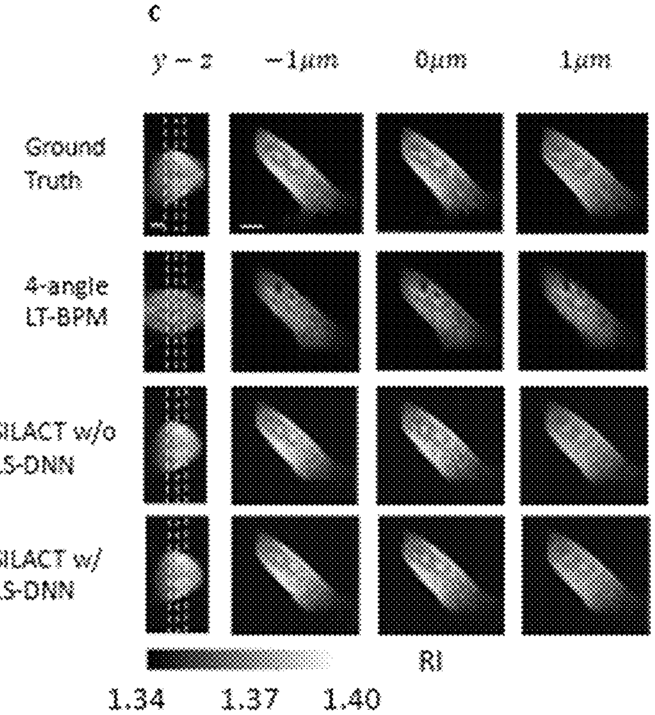

In FIGS. 10A-10B, a further comparison of reconstructions by LT-BPM with the same four illumination angles is shown in FIG. 6A, SILACT without LS-DNN, SILACT with LS-DNN, and the ground truth (generated by LT-BPM with all 49 illumination angles). From the comparison, it is clearly seen that SILACT method with LS-DNN enhancement enables reconstructions with optimal visualization performances for all classes of cells.

7. Impact of Different Training Loss Metrics

Figures 10D, 11A:
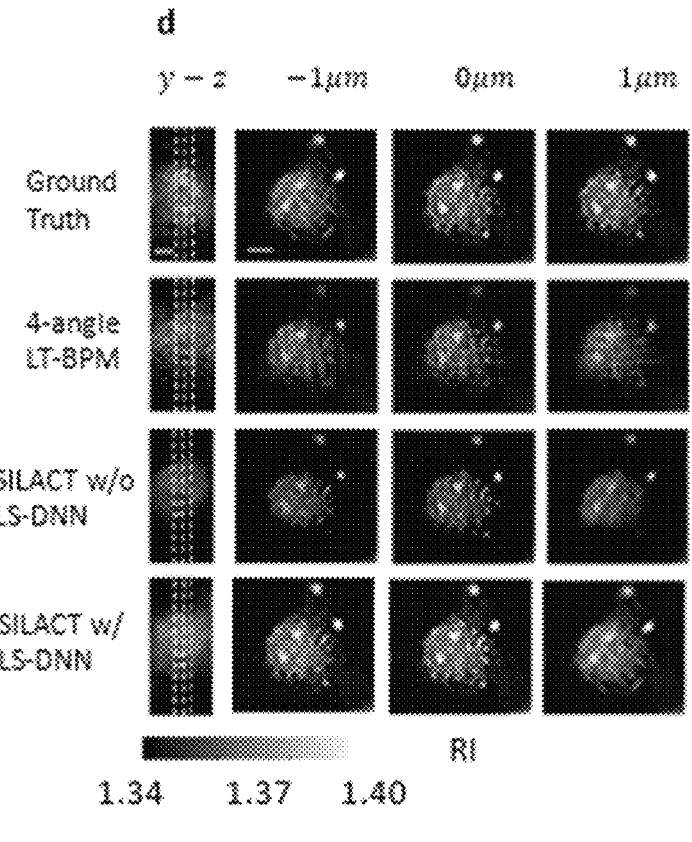
Figure 11B:
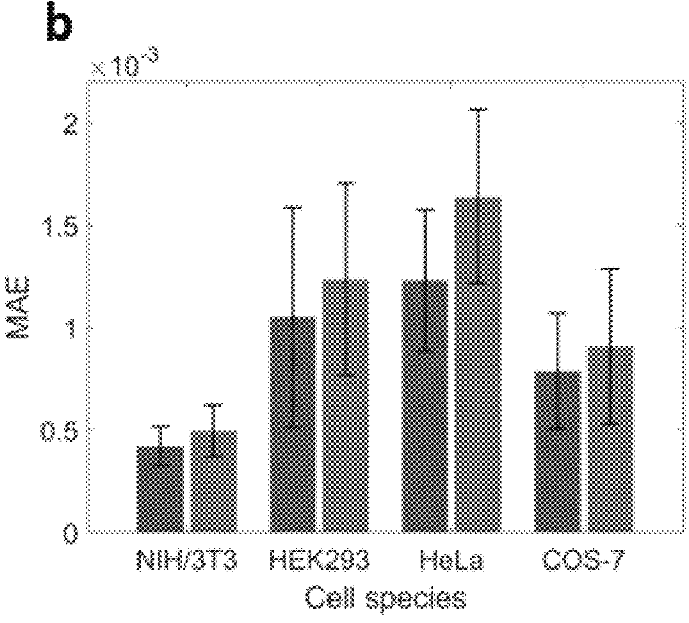
Figure 11C:
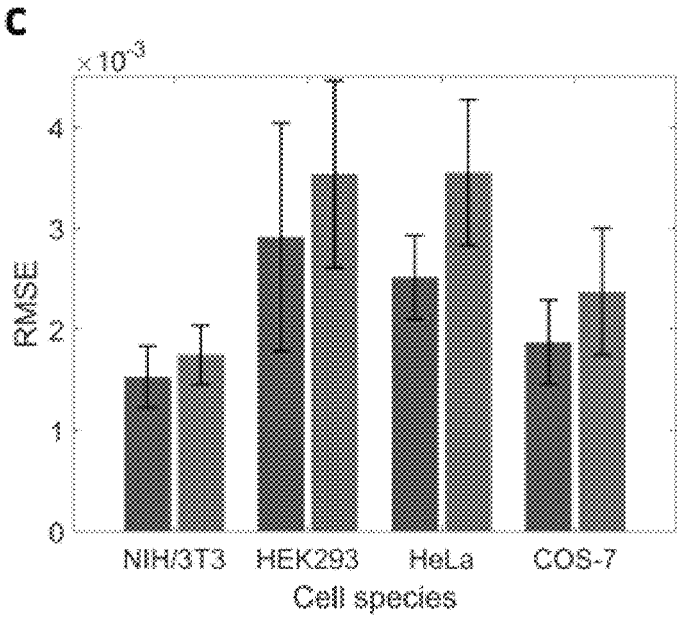

In FIGS. 11A-11C, the role of the training loss function in the quality of the reconstructions is investigate. From FIGS. 11A-11C, it is seen that when all other factors are kept same, NPCC as the training loss function gives us the best reconstructions when incorporating linear fitting, in terms of all quantitative metrics (PCC, MAE, and RMSE). Therefore, the use of NPCC as the training loss function, despite the need for a further step of linear fitting, is completely justified.

8. Analysis of Cells

In the analysis of red blood cells' deformation, the regionprops3 function in MATLAB is utilized to calculate the eigenvalues of RBCs' shape in 3D. Firstly, the first eigenvalue $\varepsilon_1$, which is the length of the long axis of the fitted ellipsoid shape is chosen. Then the last two eigenvalues the mean value of the last two eigenvalues, $\varepsilon_2$ and $\varepsilon_3$, are picked and the larger one is chosen as the dominator. Then the ratio of the lengths of long and short axes is calculated as the eccentricity of the RBC $\zeta$, which could be expressed as:

$$\zeta = \frac{\varepsilon_1}{\max(\varepsilon_2, \varepsilon_3)}. \tag{17}$$

For the analysis of NIH/3T3 cells in the microfluidic channel, the regionprops3 function in MATLAB is also used to calculate the volumes and surface areas in 3D. The dry mass of the cell m could be calculated with the formula shown below, according to ref[7].

For determining the throughput of the 3D flow image cytometry based on the SILACT system and method, a customized algorithm which is realized on the platform of MATLAB is utilized. Since most of the cells are flowing near the focal plane of our interferometric microscope, and usually there is only one layer of cells, the centre layer (the $50^{th}$ layer) of the reconstructed RI map is taken for the cell segmentation and counting. A threshold RI value (usually 1.37) is set for extracting the cell regions, and then bwlabel function in MATLAB is used to segment different cells. To inhibit the repeated counting of the cells, the Pearson Correlation Coefficient (PCC) values between the cells are calculated in two adjacent frames and the cells which have PCC values larger than 0.90 with cells in previous frames are excluded. In the analysis, 936 NIH/3T3 cells and 1340 RBCs in 2000 frames under a frame rate of 12,500 fps are counted. Namely, a throughput of analysing the 3D RI maps of over 5,000 cells (5850 NIH/3T3 cells or 8500 RBCs) in one second can be achieved with the flow image cytometer based on SILACT.

9. The NIH/3T3 Cell Trained Vs RBC Trained Models when Imaging Deformed RBCs in Microfluidic Channels In Section 2.5 in above, it is demonstrated that the application of SILACT to reconstruct and analyze the 3D morphology of deformed RBCs when flowing through a microchannel. In this section, the prediction results on RBCs of two ML engines (models) are compared, one being trained with NIH/3T3 cells, as discussed above, while the other being trained with RBCs (500 image pairs for training, 5% for validation), in order to justify the adoption of ML engine trained with RBCs and further demonstrate the generalization ability of our SILACT method.

Figure 12A:
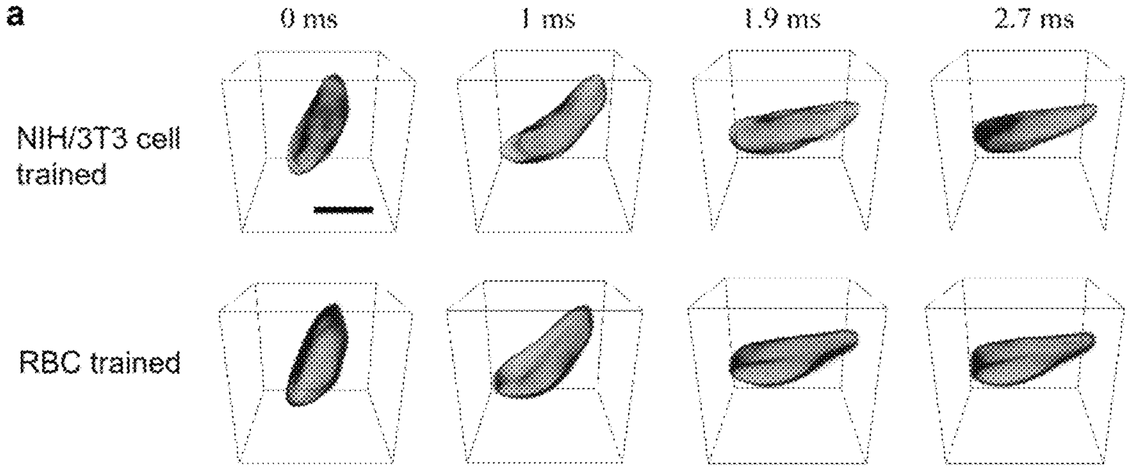
Figure 12B:
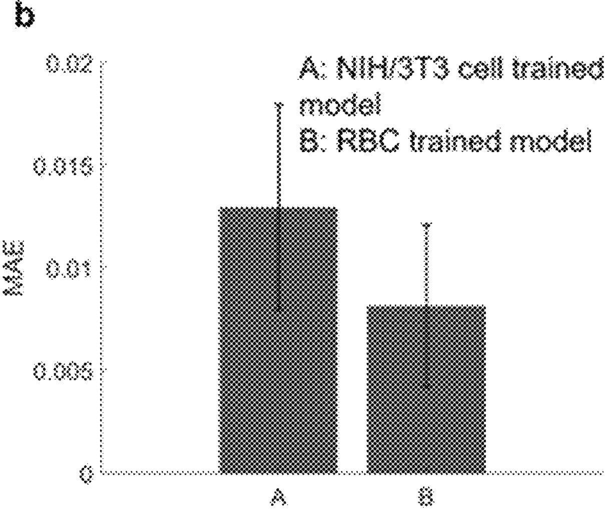
Figure 12C:
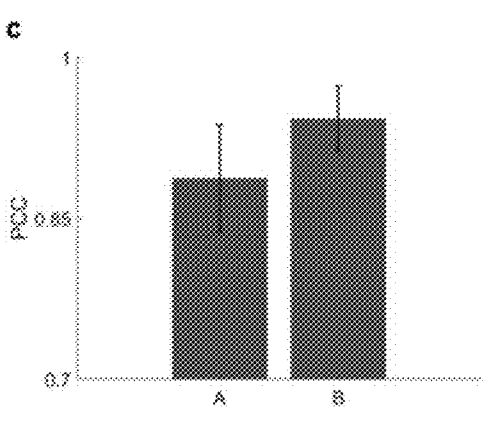

Firstly, the ML engines trained with NIH/3T3 cells and RBCs are tested on 100 images of RBCs in static states, and their testing results are quantitatively evaluated with MAE and PCC, and are shown in FIGS. 12B-12C. It seems that the 3T3 cell trained ML engine has worse performances, however, its averaged testing PCC value is still larger than 0.85 (0.89±0.05). On the other hand, the testing PCC value of RBC trained ML engine is 0.94±0.03.

Figure 12D:
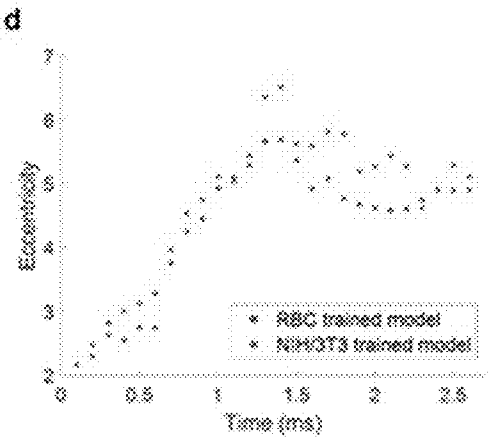
Figure 12E:
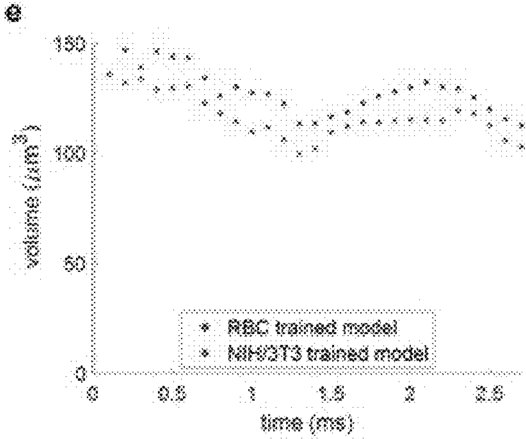

After that, these two ML engines are used to predict the 3D RI maps of the deformed flowing RBCs shown in FIG. 4A. The same single RBC in FIG. 4B is picked and it is shown that its 3D RI maps reconstructed by ML engines trained with 3T3 cells and RBCs at different time points in FIG. 12A. It is demonstrated that despite some mismatches in fine structures, the 3D contours of the RBCs are consistent in both models. Furthermore, the extracted morphological indices (3D eccentricity & volume) are quite similar in the results reconstructed by both ML engines, as shown in FIGS. 12D and 12E.

The results predicted by the ML engine trained with RBCs are shown above to inhibit the emergence of any controversial fine structure generated by the DNN model trained with NIH/3T3 cells. However, it is worth noticing that similar morphological parameters can be extracted no matter from which ML engine the results are predicted, further validating the outstanding generalization ability of SILACT.

10. Microfluidic Chip Fabrication

The microfluidic device used to image cells under the proposed SILACT is fabricated following standard soft lithography". Positive photoresist AZ 4620 (AZ Electronic Materials) is spun on a 4" silicon wafer at a speed of 5000 RPM for 30 s to obtain a master mold of 5 μm height. The photoresist is exposed under UV (ABM-USA) through a premade Cr/Au mask (Microcad Photo-Mask Ltd) carrying the designed microchannel. The exposed photoresist is then developed by a developer (AZ400K: deionized water=1:4, by volume). On the other hand, to obtain a master mold of 18 μm and 30 μm height, negative photoresist SU8-3050 (Kayaku Advanced Materials) is spun on a 4" silicon wafer at the speed of 5000 RPM and 3000 RPM for 30 s, respectively. The SU-8 patterns are developed and baked following the manufacturer's protocol. The developed patterns (for both AZ 4620 and SU8-3050) are subsequently hard backed at 180° C. for 3 hours with a ramp of 1° C./min on a programmable hot plate (Torrey Pines Scientific). The surface of produced mold is treated with a thin anti-adhesive hydrophobic layer of Trichloro(1H,1H,2H,2H-perfluorooctyl) silane (TOFC, Sigma Aldrich, catalog no. 448931) by placing the mold together with TOFC in a desiccator for 30 minutes under a fume hood[9] as shown in FIGS. 13A-13D.

Figure 13A:
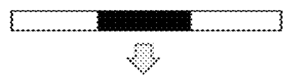
Figure 13B:
Figure 13C:
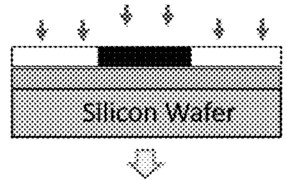
Figure 13D:
Figure 13E:
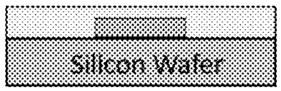

Subsequently, pre-mixed polydimethylsiloxane (PDMS) (SYLGARD™ 184 Silicone Elastomer Kit, base: curing agent=1:10) is spun on fabricated master mold at 500 RPM for 30 s to produce a ~200 μm layer of PDMS film[10]. The PDMS film is cured at 70° C. for 2 hours as shown in FIG. 13E. To create the inlet and outlet of the microchannel, firstly, two pre-made PDMS blocks (20×20×3 mm) and the surface of the cured PDMS film are activated by oxygen plasma (Harrick Plasma, Expanded Plasma Cleaner).

Figure 13F:
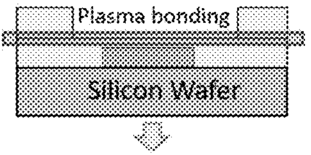
Figure 13G:
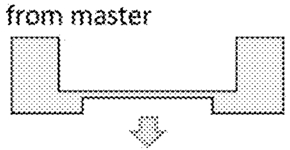
Figure 13H:
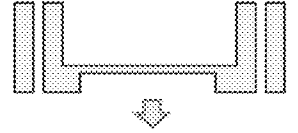
Figure 13I:
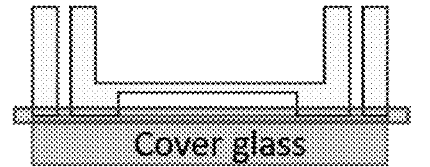
Figure 13J:
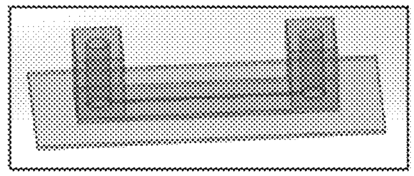

The PDMS blocks are then assembled onto the PDMS film by aligning on top of the inlet and outlet regions of the microchannel under an inverted microscope as shown in FIG. 13F. The master mold along with the PDMS film is baked at 110° C. for 20 minutes to ensure permanent bonding of the assembly. Finally, the PDMS assembly is carefully peeled off, hole punched, and sealed with a No. 1 cover glass by plasma bonding as shown in FIGS. 13G-13I. The thickness of the microfluidic chip is measured with a digital Vernier caliper as shown in FIG. 14A for a thickness below 350 μm, to satisfy the required working distance of objectives OL1 and OL2. The fabricated microfluidic device is then placed at the observation stage of the proposed ODT for subsequent measurements as shown in FIG. 14B. The microfluidic chips and tubing accessories are sterilized before each experiment. The samples are introduced into the microfluidic device by a syringe pump (Harvard Apparatus, PHD 2000) at the designated volumetric flow rate.

11. Preparation of Measurement Buffer (MB)

Figure 15:
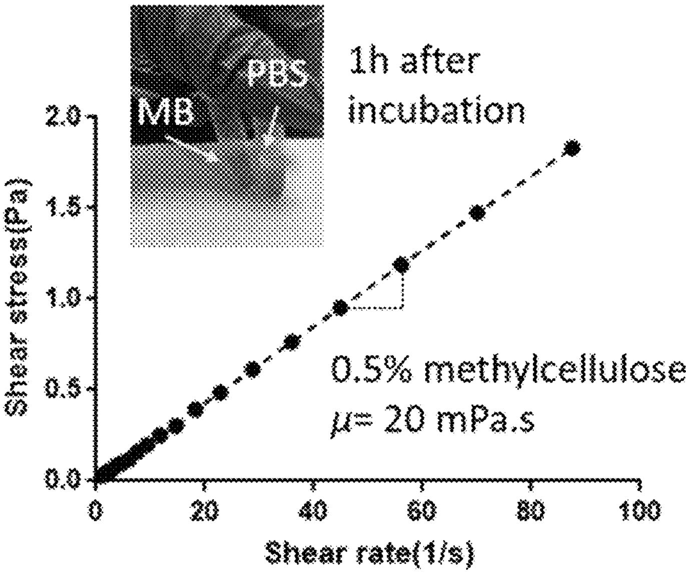
FIG. 15 shows relationships between shear rate and stress of the prepared measurement buffer, wherein the viscosity is adjusted to 15 mPa·s by adding PBS to prepare RBCs suspension for subsequent experiments, wherein inset shows that a negligible portion of cells are sedimented in MB after 1 hour of incubation at 37° C., according to an embodiment of the subject invention.

A solution of 15 mPa·s viscosity is prepared as the measurement buffer to inhibit cell sedimentation and to generate a sufficient shear rate (~20,000 $s^{-1}$) at low cell velocity[11]. The measurement buffer is prepared by dissolving methylcellulose in a physiological buffer (PBS) (0.5%, w/v). To fully dissolve the methylcellulose[12], the solution is mixed with a rotary mixture for 24 hr. The undissolved residue is removed by a vacuum filter (MF-Millipore™ Membrane Filter, 0.22 μm pore size). The viscosity of the obtained buffer is characterized as shown in FIG. 15 using a rotational rheometer (Malvern Kinexus Lab+) and calibrated to 15 mPa·s by the addition of PBS. Inset of FIG. 15 shows that a negligible portion of cells is sedimented in MB compared to PBS after 1 hour of incubation at 37° C. Therefore, to enable a prolonged duration of the cell observations, red blood cells are suspended in the MB for the subsequent experiments.

Materials and Methods

4. Methods and Materials

The basic principles of the SILACT experimental platform and algorithmic pipeline introduced briefly in section 2.1 are elaborated. Section 4.1 describes the interferometric optical microscope apparatus that acquires multiplex interferograms with a high-speed camera. Section 4.2 discusses the estimation of Phase Approximants from the multiplex interferogram. The design of LS-DNN and training strategy for SILACT's ML engine are provided in Section 4.3. The technical descriptions of Sections 4.1-3 are also graphically summarized in FIGS. 5A-5C. Brief technical introductions to alternative ODT methods vis-à-vis SILACT are in section 4.4. Cell preparation protocols are described in Section 4.5. Additional technical details and analysis of experimental results are provided in Supplementary Materials.

4.1 High-Speed Angle-Scanning and Angle-Multiplex Interferometric Microscope

The schematic of the interferometric microscope apparatus used in SILACT is shown in FIG. 5A. A 532 nm laser (CNI Lasers, MGL-III-532-300 mW) is the illumination source. The laser beam is divided into two beams by a 1×2 single-mode fiber coupler (SMFC). One beam serves as the reference for interferometric detection, while the other is directed to the sample. The sample beam is collimated by a lens L1 (f1=200 mm), then impinges onto DMD D1 (Texas Instruments Inc., DLP LightCrafter 9000), which is programmed for displaying Lee hologram patterns consisting of multiple diffracted plane waves. Lens L2 (f2=150 mm) enables these reflected beams to form a series of diffraction spots at the Fourier plane, where the second DMD2 (Texas Instruments Inc., DLP LightCrafter 6500) is placed. The filter mask patterns shown in inset 1 of the figure are loaded onto DMD2 to block spurious diffraction orders and only allow downstream the desired 1st diffraction order. Next, the filtered beam is collimated by lens L3 (f3=200 mm), followed by a 4f system composed of a tube lens L4 (f4=300 mm) and an objective lens OL1 (Zeiss, 63X/1.3, water immersion). The 4f system magnifies the angular range of the sample beam. After incidence on the sample, the scattered light is collected by the objective lens OL2 (Zeiss, 63X/1.25, oil immersion), then reflected by mirror M1 and collimated by lens L5 (f5=150 mm). A beam splitter (BS) behind lens L5 combines the sample and the reference beams into the multiplex interferogram, which is spatially magnified by the 4f system consisting of lens L6 (f6=60 mm) and L7 (f7=400 mm). The resulting raw image is captured by a high-speed camera (Photron, Fastcam SA-X2).

4.2 Phase Approximant Retrieval

The multiplex interferogram is first spatially Fourier transformed. An example of this operation is shown in FIG. 5B. Nine bright spots can be seen near the central region of the Fourier space. The central spot is the $0^{th}$ diffraction order or Direct Current (DC) image, while the other eight spots are pairwise cross-correlations of the four scattered beams and the reference beam. The top right and bottom left regions are the $+1^{st}$ and $-1^{st}$ orders which correspond to interference between each one of the four scattered beams and the reference beam. To extract the phase maps of the 4 illumination angles individually, four specially designed spectral filters are digitally applied to the $+1^{st}$ order. The retrieved Phase Approximants are shown in FIG. 5B. The mathematical formulation of the interferogram and the retrieval of the Phase Approximants are in the Supplementary Material, Section S1.

4.3 Learning to Synthesize by DNN

The motivation for developing the technique is based on an observation that 2D reconstructions by machine learning often exhibit deficiencies at the high end of the spatial frequency spectrum, attributing to the relative sparsity of high frequencies in training databases[41]. To compensate the deficiencies, the two-step LS-DNN algorithm splits the spectral information into two bands, high and low, processes them separately, and then recombines. This requires three DNNs, which are trained separately, as shown in FIG. 5C: one trained for the high-frequency bands, DNN-H; one trained for the low-frequency bands, DNN-L; and a final "synthesizer" DNN-S trained to output the compensated reconstruction exhibiting even fidelity at all frequency bands[47].

The previously 2D-oriented LS principle[47] is modified to work for 3D RI reconstruction from Phase Approximants, as discussed below. Let n(x,y,z) denote the refractive index as function of Cartesian coordinates (x,y,z) with z=0 corresponding to the center of the reconstructed 3D RI map. In SILACT, the ground truth 3D RI maps contain 100 layers along the z-direction, and the interval between adjacent layers is 0.21 The cells used are mostly confined to a small axial dimension with $|z|\leq 8$ μm (equivalently to 80 layers). Within the cell support, most organelles are located at layers $|z|\leq 6$ μm, where the high frequencies are of the highest significance. In the region 6 μm$<|z|\leq 8$ μm, the cell boundaries contain relatively less fine detail, whereas $|z|>8$ μm is typically void. Accordingly, the spatial filter is defined as $$M(k_x, k_y; z) = \begin{cases} 1, & |z| > 8\ \mu\text{m(no filtering)} \\ (k_x^2 + k_y^2)^{0.8}, & 6\ \mu\text{m} < |z| \leq 8\ \mu\text{m(moderate filtering)} \\ (k_x^2 + k_y^2)^{1.5}, & |z| \leq 6\ \mu\text{m(strong filtering)} \end{cases} \quad (1)$$

Letting F(•) denote the Fourier transform operator, filtered refractive index functions $\tilde{n}(x,y,z)=F^{-1}(F(n(x,y,z))M(k_x,k_y;z))$ is produced for use in the DNN-H pipeline, both training and in actual operation. For the DNN-L pipeline, the unfiltered n(x,y,z) is used. The DNNs are trained separately in supervised mode, as in the previous work of 2D LS-DNN[47].

The aforementioned LS-DNN architecture works well for the training of NIH/3 T3 cells as discussed above. However, even if the ML engine trained with only NIH/3T3 has satisfactory generalization ability, training on other types of cells is sometimes necessary to further improve the performance of the ML engine. For example, the hyperparameters in the NIH/3T3 cell trained DNN model can be fine-tuned by training on a small number of other types of cells (transfer learning). Since different types of cells have various cellular structures, the training strategies on different species of cells are distinct. For example, RBCs have simpler structures and smaller sizes than NIH/3T3 cells. Therefore, only the input-ground truth pairs of RBCs could be used as the training dataset to train DNN-L (Section S9, Supplementary materials). Furthermore, the hyperparameters of the high-pass filters can be changed to accommodate the training of different species of cells.

To design SILACT's ML engine, a dataset having 900 input ensembles obtained from NIH/3T3 cells is used. Each ensemble includes four Phase Approximants estimated from a corresponding multiplex interferogram; and the ground truth for the same scene, that is, the 3D RI map reconstructed from 49 true phase maps with LT-BPM (see Section 4.4). From the dataset, 5% of the ensembles are used for validation and a further 39 disjoint ensembles are reserved for testing. The remaining ensembles are used for training. For the data shown in Section 2.5, the same procedure is carried out but with RBCs instead of NIH/3T3 cells.

The training loss function is the Negative Pearson Correlation Coefficient (NPCC), defined as $$NPCC(n, \hat{n}) = -\frac{\sum_i (n_i - \overline{n})(\hat{n}_i - \overline{\hat{n}})}{\sqrt{\sum_i (n_i - \overline{n})^2 \sum_i (\hat{n}_i - \overline{\hat{n}})^2}}, \quad (2)$$

where n and $\hat{n}$ are the ground truth and the output of a neural network, respectively; $\overline{n}$ and $\overline{\hat{n}}$ are their means; and i indexes the voxels. This choice has been previously proven capable of reconstructing fine features with good fidelity[41]. NPCC is invariant under affine transformations, that is, NPCC(n, $\hat{n}$)=NPCC(n, a$\hat{n}$+b) for all a, b. Therefore, to obtain indices of refraction at the correct scale, in the validation examples the training ground truth is linearly fit to the neural network output and the coefficients $\alpha_1$, $\alpha_2$ are estimated from least squares (refer to Supplementary Material, Section S7). The estimated values of $\alpha_1$, $\alpha_2$ are then fixed for the subsequent operation of SILACT and finally produced the quantitative 3D RI map $\hat{n}_{final}(x,y,z)=\alpha_1\hat{n}(x,y,z)+\alpha_2$.

4.4. Cell Preparation

COS-7, HeLa, NIH/3T3, and HEK293T cell lines are obtained from American Type Culture Collection (ATCC) and tested free of mycoplasma contamination. Cells are cultured in a 6-well plate (SPL) and immersed in high-glucose DMEM (GIBCO), supplemented with 10% fetal bovine serum (GIBCO) and 1% penicillin-streptomycin (GIBCO). Cells are passaged every 2-3 days and are incubated at 37° C. in a humidified atmosphere containing 5% $CO_2$.

For live-cell imaging, cells are plated in 50 mm ibidi μ-dish with ibiTreat (Ibidi) at 2500 cells/cm$^2$ with a 24-hour long growth. Two hours before imaging, the debris and non-attached cells are removed and washed gently by 1× sterile phosphate buffer saline (PBS). Finally, complete cell growth medium is added for live-cell imaging.

Red blood cell collection: BALB/c mice are maintained by the Laboratory Animal Service Centre, The Chinese University of Hong Kong, Shatin, Hong Kong SAR. All animal procedures are conducted with the approval of the Animal Experimentation Ethics Committee (Ref No.: 18/233/MIS) of The Chinese University of Hong Kong and the Department of Health, the Government of the HKSAR under the Animals (Control of Experiments) Ordinance, Chapter 340 (18-522 in DH/SHS/8/2/1 Pt.12 and 18-523 in DH/SHS/8/2/1 Pt.12). For the withdrawal of blood, the mouse is first restrained and approximately 100 μL blood is collected from the saphenous vein by puncturing with a 25 AWG needle (Becton Dickinson) to a heparinized capillary tube. The collected blood is then washed twice with PBS by centrifugation at 500×g for 5 min and pellets of RBCs are obtained. Finally, the supernatant is discarded, and RBCs are resuspended with PBS and ready for subsequent experiments.

Expired human RBCs (HA RE001F3) are aspirated from a 200 mL unit of packed RBCs using 23 AWG needle in a 1 mL syringe (Becton Dickinson) and washed twice with PBS by centrifugation 500×g for 5 min to obtain the pellet of human RBCs. The isolated RBCs are then resuspended in PBS for subsequent experiments.

All investigations are conducted with freshly isolated RBCs (within 4 hours from the collection either from mice or human blood unit). All centrifugations to isolate RBCs are conducted at 4° C. using a high-speed refrigerated centrifuge (Neo-fuge 13 R, Heal Force).

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1 Boutros, M., Heigwer, F. & Laufer, C. Microscopy-based high-content screening. Cell vol. 163 1314-1325 (2015).
2. Krutzik, P. O. & Nolan, G. P. Fluorescent cell barcoding in flow cytometry allows high-throughput drug screening and signaling profiling. Nat. Methods 3, 361-368 (2006).
3. Krutzik, P. O., Crane, J. M., Clutter, M. R. & Nolan, G. P. High-content single-cell drug screening with phosphospecific flow cytometry. Nat. Chem. Biol. 4, 132-142 (2008).
4. Newman, A. M. et al. Determining cell type abundance and expression from bulk tissues with digital cytometry. Nat. Biotechnol. 37, 773-782 (2019).
5. Porpiglia, E. et al. High-resolution myogenic lineage mapping by single-cell mass cytometry. Nat. Cell Biol. 19, 558-567 (2017).
6. Nitta, N. et al. Intelligent image-activated cell sorting. Cell 175, 266-276.e13 (2018).
7 Park, Y. K. et al. Measurement of red blood cell mechanics during morphological changes. Proc. Natl. Acad. Sci. U.S.A 107, 6731-6736 (2010).
8. Hosseini, P. et al. Cellular normoxic biophysical markers of hydroxyurea treatment in sickle cell disease. Proc. Natl. Acad. Sci. U.S.A 113, 9527-9532 (2016).
9. Rosendahl, P. et al. Real-time fluorescence and deformability cytometry. Nat. Methods 15, 355-358 (2018).
10. Thachil, J. & Bates, I. Approach to the diagnosis and classification of blood cell disorders. in Dacie and Lewis Practical Haematology: Twelfth Edition 497-510 (2017).
11. Urbanska, M., Rosendahl, P., Krater, M. & Guck, J. High-throughput single-cell mechanical phenotyping with real-time deformability cytometry. Methods Cell Biol. 147, 175-198 (2018).
12. Park, H. S. et al. Quantitative phase imaging of erythrocytes under microfluidic constriction in a high refractive index medium reveals water content changes. Microsystems Nanoeng. 5, (2019).
13. Park, H. S., Ceballos, S., Eldridge, W. J. & Wax, A. Invited article: digital refocusing in quantitative phase imaging for flowing red blood cells. APL Photonics 3, (2018).
14. Park, Y. K. et al. Refractive index maps and membrane dynamics of human red blood cells parasitized by *Plasmodium falciparum*. Proc. Natl. Acad. Sci. U.S.A 105, 13730-13735 (2008).
15. Coutu, D. L., Kokkaliaris, K. D., Kunz, L. & Schroeder, T. Multicolor quantitative confocal imaging cytometry. Nat. Methods 15, 39-46 (2018).
16. Choi, H., Wadduwage, D. N., Tu, T. Y., Matsudaira, P. & So, P. T. C. Three-dimensional image cytometer based on widefield structured light microscopy and high-speed remote depth scanning. Cytom. Part A 87, 49-60 (2015).
17. Han, Y., Gu, Y., Zhang, A. C. & Lo, Y. H. Review: Imaging technologies for flow cytometry. Lab Chip 16, 4639-4647 (2016).
18. Lee, K. C. M. et al. Quantitative Phase imaging flow cytometry for ultra-large-scale single-cell biophysical phenotyping. Cytom. Part A 95, 510-520 (2019).
19. Cho, S. H. et al. Review Article: Recent advancements in optofluidic flow cytometer. Biomicrofluidics 4, 043001 (2010).
20. Gualda, E. J., Pereira, H., Martins, G. G., Gardner, R. & Moreno, N. Three-dimensional imaging flow cytometry through light-sheet fluorescence microscopy. Cytom. Part A 91, 144-151 (2017).
21. Muller, M. Introduction to confocal fluorescence microscopy. (SPIE Press, 2006).
22. Power, R. M. & Huisken, J. A guide to light-sheet fluorescence microscopy for multiscale imaging. Nat. Methods 14, 360-373 (2017).
23. Chen, B. C. et al. Lattice light-sheet microscopy: Imaging molecules to embryos at high spatiotemporal resolution. Science (80-.). 346, (2014).
24. Shao, L., Kner, P., Rego, E. H. & Gustafsson, M. G. L. Super-resolution 3D microscopy of live whole cells using structured illumination. Nat. Methods 8, 1044-1048 (2011).
25. Han, Y. et al. Cameraless high-throughput three-dimensional imaging flow cytometry. Optica 6, 1297 (2019).

26. Lim, J., Ayoub, A. B., Antoine, E. E. & Psaltis, D. High-fidelity optical diffraction tomography of multiple scattering samples. Light Sci. Appl. 8, 1-12 (2019).

27. Stehbens, S., Pemble, H., Murrow, L. & Wittmann, T. Imaging intracellular protein dynamics by spinning disk confocal microscopy. in Methods in Enzymology vol. 504 293-313 (Elsevier Inc., 2012).

28. Bai, C. et al. 3D Imaging Restoration of spinning-disk confocal microscopy via deep learning. IEEE Photonics Technol. Lett. 32, 1131-1134 (2020).

29. Auksorius, E. et al. In vivo imaging of human cornea with high-speed and high-resolution Fourier-domain full-field optical coherence tomography. arXiv 11, 2849-2865 (2020).

30. Yanny, K. et al. Miniscope3D: optimized single-shot miniature 3D fluorescence microscopy. Light Sci. Appl. 9, (2020).

31. Adams, J. K. et al. Single-frame 3D fluorescence microscopy with ultraminiature lensless FlatScope. Sci. Adv. 3, 1-10 (2017).

32. Iyer, R. R. et al. Full-field spectral-domain optical interferometry for snapshot three-dimensional microscopy. Biomed. Opt. Express 11, 5903 (2020).

33. Boddington, S. E. et al. Labeling human mesenchymal stem cells with fluorescent contrast agents: the biological impact. Mol. Imaging Biol. 2010 131 13, 3-9 (2010).

34. Ganini, D. et al. Fluorescent proteins such as eGFP lead to catalytic oxidative stress in cells. Redox Biol. 12, 462-468 (2017).

35. Sung, Y. et al. Size homeostasis in adherent cells studied by synthetic phase microscopy. Proc. Natl. Acad. Sci. U.S.A 110, 16687-16692 (2013).

36. Choi, W. et al. Tomographic phase microscopy. Nat. Methods 4, 717-719 (2007).

37. Kim, T. et al. White-light diffraction tomography of unlabelled live cells. Nat. Photonics 8, 256-263 (2014).

38. Jin, D., Zhou, R., Yaqoob, Z. & So, P. T. C. Dynamic spatial filtering using a digital micromirror device for high-speed optical diffraction tomography. Opt. Express 26, 428 (2018).

39. Jin, D., Zhou, R., Yaqoob, Z. & So, P. T. C. Tomographic phase microscopy: principles and applications in bioimaging [Invited]. J. Opt. Soc. Am. B 34, B64 (2017).

40. Wang, H. et al. Deep learning enables cross-modality super-resolution in fluorescence microscopy. Nat. Methods 16, 103-110 (2019).

41. Li, S. & Barbastathis, G. Spectral pre-modulation of training examples enhances the spatial resolution of the phase extraction neural network (PhENN). Opt. Express 26, 29340 (2018).

42. Goy, A., Arthur, K., Li, S. & Barbastathis, G. Low photon count phase retrieval using deep learning. Phys. Rev. Lett. 121, 243902 (2018).

43. Ounkomol, C., Seshamani, S., Maleckar, M. M., Collman, F. & Johnson, G. R. Label-free prediction of three-dimensional fluorescence images from transmitted-light microscopy. Nat. Methods 15, 917-920 (2018).

44. Kim, K. et al. High-resolution three-dimensional imaging of red blood cells parasitized by *Plasmodium falciparum* and in situ hemozoin crystals using optical diffraction tomography. J. Biomed. Opt. 19, 1 (2013).

45. Kamilov, U. S. et al. Optical tomographic image reconstruction based on beam propagation and sparse regularization. IEEE Trans. Comput. Imaging 2, 59-70 (2016).

46. Kamilov, U. S. et al. Learning approach to optical tomography. Optica 2,517 (2015).

47. Deng, M., Li, S., Goy, A., Kang, I. & Barbastathis, G. Learning to synthesize: robust phase retrieval at low photon counts. Light Sci. Appl. 9, (2020).

48. Li, S., Deng, M. O., Lee, J., Sinha, A. & Barbastathis, G. Imaging through glass diffusers using densely connected convolutional networks. Optica 5, (2018).

49. Candès, E. J., Romberg, J. K. & Tao, T. Stable signal recovery from incomplete and inaccurate measurements. Commun. Pure Appl. Math. 59, 1207-1223 (2006).

50. Donoho, D. L. Compressed sensing. IEEE Trans. Inf. Theory 52, 1289-1306 (2006).

51. Brady, D. J. Optical Imaging and Spectroscopy. Optical Imaging and Spectroscopy (John Wiley & Sons, 2008).

52. Panigrahi, S., Nanda, A. & Swarnkar, T. A survey on transfer learning. Smart Innov. Syst. Technol. 194, 781-789 (2021).

53. Sung, Y. et al. Optical diffraction tomography for high resolution live cell imaging. *Opt. InfoBase Conf. Pap.* 17, 1977-1979 (2009).

54. Lim, J. et al. Comparative study of iterative reconstruction algorithms for missing cone problems in optical diffraction tomography. *Opt. Express* 23, 16933 (2015).

55. Kamilov, U. S. et al. Learning approach to optical tomography. *Optica* 2, 517 (2015).

56. Kamilov, U. S. et al. Optical Tomographic Image Reconstruction Based on Beam Propagation and Sparse Regularization. *IEEE Trans. Comput. Imaging* 2, 59-70 (2016).

57. Ziemczonok, M., Kuś, A., Wasylczyk, P. & Kujawińska, M. 3D-printed biological cell phantom for testing 3D quantitative phase imaging systems. *Sci. Rep.* 9, 1-9 (2019).

58. He, K., Zhang, X., Ren, S. & Sun, J. Deep residual learning for image recognition. *Proc. IEEE Comput. Soc. Conf. Comput. Vis. Pattern Recognit.* 2016-December, 770-778 (2016).

59. Nguyen, T. H., Kandel, M. E., Rubessa, M., Wheeler, M. B. & Popescu, G. Gradient light interference microscopy for 3D imaging of unlabeled specimens. *Nat. Commun.* 8, (2017).

60. Cui, X. et al. Lensless high-resolution on-chip optofluidic microscopes for *Caenorhabditis elegans* and cell imaging. *Proc. Natl. Acad. Sci.* 105, 10670-10675 (2008).

61. Qin, D., Xia, Y. & Whitesides, G. M. Soft lithography for micro- and nanoscale patterning. *Nat. Protoc.* 5, 491-502 (2010).

62. Zhang, W. Y. & Ferguson, G. S. ELASTOMER-SUPPORTED COLD WELDING FOR ROOM TEMPERATURE WAFER-LEVEL BONDING 'W. in vol. 2 2-5.

63. R. Byron Bird, Warren E. Stewart, E. N. L. *Transport Phenomena*. (John Wiley and Sons, 2007).

64. Urbanska, M., Rosendahl, P., Krater, M. & Guck, J. High-throughput single-cell mechanical phenotyping with real-time deformability cytometry. *Methods Cell Biol.* 147, 175-198 (2018).

We claim:

1. A single-frame label-free cell tomography (SILACT) system for reconstructing three-dimensional (3D) refractive index (RI) value distribution of cell samples, comprising:

an interferometric microscope device with angle-multiplexing optics to capture one or more interferograms of the cell samples; and a machine-learning (ML) engine configured to reconstruct a 3D RI map of the cell samples based on the one or more interferograms captured;

wherein for each cell sample, the interferometric microscope device is configured to acquire a multiplex single-frame interferogram of the cell sample by scanning the cell sample simultaneously with a plurality of beams having a same elevation angle and different azimuthal angles.

2. The SILACT system of claim 1, wherein the ML engine is configured to compensate for missing spatial frequency information.

3. The SILACT system of claim 1, wherein for each cell sample, the interferometric microscope device is configured to:

acquire a plurality of sequential interferograms of the cell sample, each by scanning from a single scanning illumination angle.

4. The SILACT system of claim 3, wherein the different azimuthal angles include 0°, 90°, 180°, and 270°.

5. The SILACT system of claim 1, wherein the ML engine comprises:

an interferogram pre-process unit configured to pre-process the interferogram(s) received from the interferometric microscope device; and a 3D reconstruction unit receiving outputs of the interferogram pre-process unit and configured to reconstruct the 3D RI map and recover the RI values by linear fitting steps.

6. The SILACT system of claim 5, wherein the interferogram pre-process unit is configured to:

pre-process the plurality of sequential interferograms received from the interferometric microscope device to generate a ground truth 3D RI map of the cell sample by physical-model based reconstruction steps; and pre-process the multiplex single-frame interferogram received from the interferometric microscope device to extract a plurality of Phase Approximants by spatial filtering steps.

7. The SILACT system of claim 6, wherein the 3D reconstruction unit is configured to:

train a Deep Neural Network (DNN) based on the ground truth 3D RI map and the plurality of Phase Approximants generated by the interferogram pre-process unit to reconstruct the 3D RI map of the cell samples.

8. The SILACT system of claim 6, wherein the physical-model based reconstruction steps are based on Learning Tomography Beam Propagation Method (LT-BPM).

9. The SILACT system of claim 6, wherein reliability of the physical-model based reconstruction steps is validated by calibration of calibration cell samples.

10. The SILACT system of claim 9, wherein the calibration cell samples include polystyrene beads or 3D printed cell phantoms.

11. The SILACT system of claim 7, wherein the DNN model is based on a Learning to Synthesize by DNN (LS-DNN) method.

12. The SILACT system of claim 7, wherein the DNN model is trained to minimize Negative Pearson Correlation Coefficient (NPCC) loss between the ground truth 3D RI map and output of the DNN model.

13. The SILACT system of claim 1, wherein the cell samples comprise NIH/3T3 cell samples.

14. The SILACT system of claim 6, wherein the ground truth 3D RI map comprises 100 layers along a z-direction.

15. The SILACT system of claim 14, wherein adjacent layers have an interval of 0.21 μm between them.

16. The SILACT system of claim 14, wherein a portion of the cell samples are confined to a small axial dimension with $|z| \leq 8$ μm that is equivalent to 80 layers.

17. The SILACT system of claim 14, wherein within cell support, most organelles are located at layers $|z| \leq 6$ μm, where high frequencies are of highest significance.

18. A single-frame label-free cell tomography (SILACT) system for reconstructing three-dimensional (3D ) refractive index (RI) value distribution of cell samples, comprising:

an interferometric microscope device with angle-multiplexing optics to capture one or more interferograms of the cell samples; and a machine-learning (ML) engine configured to reconstruct a 3D RI map of the cell samples based on the one or more interferograms captured;

wherein for each cell sample, the interferometric microscope device is configured to:

acquire a plurality of sequential interferograms of the cell sample, each by scanning from a single scanning illumination angle; and acquire a multiplex single-frame interferogram of the cell sample by scanning the cell sample simultaneously with a plurality of beams having a same elevation angle and different azimuthal angles.

19. A single-frame label-free cell tomography (SILACT) system for reconstructing three-dimensional (3D ) refractive index (RI) value distribution of cell samples, comprising:

an interferometric microscope device with angle-multiplexing optics to capture one or more interferograms of the cell samples; and a machine-learning (ML) engine configured to reconstruct a 3D RI map of the cell samples based on the one or more interferograms captured;

wherein the ML engine comprises:

an interferogram pre-process unit configured to pre-process the interferogram(s) received from the interferometric microscope device; and a 3D reconstruction unit receiving outputs of the interferogram pre-process unit and configured to reconstruct the 3D RI map and recover the RI values by linear fitting steps, wherein the interferogram pre-process unit is configured to:

pre-process the plurality of sequential interferograms received from the interferometric microscope device to generate a ground truth 3D RI map of the cell sample by physical-model based reconstruction steps; and pre-process the multiplex single-frame interferogram received from the interferometric microscope device to extract a plurality of Phase Approximants by spatial filtering steps.

* * * * *